United States Patent [19]
Botts et al.

[11] Patent Number: 6,122,632
[45] Date of Patent: Sep. 19, 2000

[54] ELECTRONIC MESSAGE MANAGEMENT SYSTEM

[75] Inventors: Jennifer M. Botts, Westerville; Karen L. Musson, Newark; Elizabeth M. Stites, Cincinnati; Douglas C. Weber, Pickerington; David A. Wilson, Galloway, all of Ohio

[73] Assignee: Convergys Customer Management Group Inc., Cincinnati, Ohio

[21] Appl. No.: 08/897,777

[22] Filed: Jul. 21, 1997

[51] Int. Cl.[7] .................................................. G06F 17/30

[52] U.S. Cl. .................................. 707/10; 707/1; 707/8; 707/103; 707/104; 705/1; 705/14; 705/27

[58] Field of Search .................................. 705/1, 14, 27; 701/37; 395/200.06, 200.36, 200.47, 200.59, 683, 200.37, 200.58; 364/188; 707/1, 8, 10, 104, 103; 345/333, 349

[56] References Cited

U.S. PATENT DOCUMENTS

| | | | |
|---|---|---|---|
| 5,727,163 | 3/1998 | Bezos | 705/27 |
| 5,734,823 | 3/1998 | Saigh | 395/200.06 |
| 5,790,790 | 8/1998 | Smith | 395/200.36 |
| 5,794,207 | 8/1998 | Walker | 705/1 |
| 5,809,242 | 9/1998 | Shaw | 395/200.47 |
| 5,819,260 | 10/1998 | Lu | 707/3 |
| 5,848,397 | 12/1998 | Marsh | 705/14 |

*Primary Examiner*—Thomas G. Black
*Assistant Examiner*—Diane D. Mizrahi
*Attorney, Agent, or Firm*—Standley & Gilcrest LLP

[57] ABSTRACT

An electronic message, or e-mail, management system having a digital computer for accepting e-mail messages; a program interface for automatically transferring received electronic messages to a database; a structured database for storing the received electronic messages in a predetermined format; and an interface for allowing a customer service representative, at a remote computer, to access, and respond to, the electronic messages stored at the database.

72 Claims, 35 Drawing Sheets

GROUP ADDRESS: cyberesponse@___.net

62

| MESSAGE | RESPONSE | STATUS | ASSIGNED | RECEIVED | ORIGINATOR SUBJECT |
|---|---|---|---|---|---|
| ○ 31 | 42 | OPENED | JENNY BOTTS | 3/24/1997 | KARENMUSSON(kmusson@_.net) TEST FOR MARSHALL |
| ○ 60 | 69 | OPENED | SHERRI | 3/27/1997 | JENNYBOTTS(jbotts@_.net) TEST 27 |
| ○ 66 | 84 | OPENED | JENNYBOTTS | 3/27/1997 | JENNY BOTTS(jbotts@_.net) TEST 33 |
| ○ 69 | 78 | OPENED | JERRY | 3/27/1997 | JENNY BOTTS(jbotts@_.net) TEST 36 |
| ○ 72 | 81 | OPENED | MARSHALL | 3/27/1997 | JENNY BOTTS(jbotts@_.net) TEST 39 |
| 70 ○ 95 | 105 | OPENED | SHERRI | 4/14/1997 | KARENMUSSON(kmusson@_.net) CYBERESPONSE QUESTION |
| ○ 129 | 139 | OPENED | CKACMARSKY | 4/24/1997 | CHRISKACMARSKY(ckacmarsky @_.net) TEST 12 |
| ○ 130 | 140 | OPENED | ISD | 4/24/1997 | CHRIS KACMARSKY(ckacmarsky @_.net) TEST 13 |
| ○ 142 | 152 | UNOPENED | UNASSIGNED | 5/1/1997 | BOB EXAM (bexam@_.net) TEST |
| ○ 143 | 153 | UNOPENED | UNASSIGNED | 5/1/1997 | BOB EXAM (bexam@_.net) TEST |
| ○ 144 | 154 | UNOPENED | UNASSIGNED | 5/1/1997 | BOB EXAM (bexam@_.net) TEST |
| ○ 145 | 155 | UNOPENED | UNASSIGNED | 5/1/1997 | BOB EXAM (bexam@_.net) TEST |
| ○ 146 | 156 | UNOPENED | UNASSIGNED | 5/1/1997 | BOB EXAM (bexam@_.net) TEST |
| ○ 147 | 157 | UNOPENED | UNASSIGNED | 5/1/1997 | BOB EXAM (bexam@_.net) TEST |

64 QA MESSAGES

| MESSAGE | RESPONSE | STATUS | ASSIGNED QA ASSIGNED | RECEIVED | ORIGINATOR SUBJECT |
|---|---|---|---|---|---|
| ○ 148 | 158 | FROM QA | ISD ISD | 5/1/1997 | BOB EXAM (bexam@_.net) TEST |
| 149 | 159 | PENDING QA | ISD UNASSIGNED | 5/1/1997 | BOB EXAM (bexam@_.net) TEST |

66 EXPERT MESSAGES

| MESSAGE | RESPONSE | STATUS | CSR ASSIGNED EXPERT | RECEIVED | ORIGINATOR SUBJECT |
|---|---|---|---|---|---|
| ○ 153 | 163 | FROM EXPERT | ISD SHERRI | 5/5/1997 | KARENMUSSON(kmusson@_.net) BUSINESS DIVISION QUESTION |
| ○ 151 | 161 | WAIT FOR EXPERT | ISD jbotts a_.net | 5/2/1997 | TEST(dwi@_.net) TEST | http://206.126.161.12/script/response/queued.idc

Fig. 14

MESSAGE INFORMATION

MESSAGE : 10
CSR RESPONDING : KARENMUSSON
TO : cyberesponse@___.net
ORIGINATOR : KARENMUSSON (kmusson@___.net)
RECEIVED : 3/10/1997
SUBJECT : INTERNATIONAL

| CATEGORIES | SELECT ONE OR MORE CATEGORIES, THEN PRESS "APPLY." THE MESSAGE MUST BE CATEGORIZED BEFORE 'REPLY NOW' IS PRESSED |
|---|---|
| BENEFITS<br>OTHER SERVICES<br>REPORTING<br>SYSTEM FEATURES<br>TEST<br>TRAINING | APPLY |

[REPLY NOW] [ASK AN EXPERT] [NO RESPONSE NEEDED] [RETURN TO QUEUED MESSAGES]

MESSAGE:

CAN YOU HANDLE INTERNATIONAL AND/OR MULTILINGUAL EMAIL?

THANKS

MESSAGE RESPONSE – INTERNET BROWSER

RESPONSE FORM | SUBMIT FOR QA | SAVE RESPONSE

DIALOGUE STATUS   ○ OPEN  ○ CLOSED

MESSAGE RESPONSE

——— ORIGINAL MESSAGE ———
ON MARCH 10, 1997 22:52, KARENMUSSON (kmusson a ___.net) WROTE:
CAN YOU HANDLE INTERNATIONAL AND/OR MULTILINGUAL EMAIL?
THANKS

STANDARD RESPONSES

☐ THIS IS A STANDARD RESPONSE TO A SAMPLE MESSAGE.

☑ CSRs ARE TRAINED EXPERTS IN CLIENT'S PRODUCTS AND PROPER NETIQUETTE.

☐ THE CYBERESPONSE EMAIL MANAGEMENT SYSTEM ENSURES ALL EMAIL INQUIRIES ARE SENT TO A CUSTOMER SERVICE REPRESENTATIVE.

☐ MESSAGE RESPONSE DATA IS AVAILABLE FOR AD HOC AND STANDARD IMMEDIATE PRODUCTION REPORTING.

☐ QUALITY CONTROL REPORTS ARE AVAILABLE BY CSR

GROUP ADDRESS: cyberesponse a _____.net

| MESSAGE | RESPONSE | STATUS | ASSIGNED | RECEIVED | ORIGINATOR SUBJECT |
|---|---|---|---|---|---|
| ○ 15 | 15 | PENDING QA | SHERRI | 3/11/1997 | JENNYBOTTS (jbotts@_____.com) RESPONSE TIME |
| ○ 65 | 74 | PENDING QA | DWILSON | 3/27/1997 | JENNYBOTTS (jbotts@_____.net) TEST 32 |
| ○ 68 | 77 | PENDING QA | KARENMUSSON | 3/27/1997 | JENNYBOTTS (jbotts@_____.net) TEST 35 |
| ○ 73 | 82 | PENDING QA | DWILSON | 3/27/1997 | JENNYBOTTS (jbotts@_____.net) TEST 40 |
| ○ 75 | 85 | PENDING QA | DWILSON | 4/9/1997 | DWILSON (dwilson@_____.net) TEST |
| ○ 76 | 86 | PENDING QA | DWILSON | 4/9/1997 | DWILSON (dwilson@_____.net) TEST 2 |
| ○ 77 | 87 | PENDING QA | DWILSON | 4/9/1997 | DWILSON (dwilson@_____.net) TEST 3 |
| ○ 148 | 158 | PENDING QA | ISD | 5/1/1997 | BOB EXAM (bexam@_____.net) TEST |
| ○ 149 | 159 | PENDING QA | ISD | 5/1/1997 | BOB EXAM (bexam@_____.net) TEST |

☐ ADMINISTRATIVE TASKS - INTERNET BROWSER

UPDATE CSR

COMPLETE THE FORM AND PRESS "APPLY" TO CHANGE THE CSR INFORMATION.

CSR ID          KARENMUSSON
PASSWORD        [xxxxxx]
CONFIRM PASSWORD [xxxxxx]

CSR PRIVILEGES

MAY THE CSR ADMINISTR DATABASE TABLES?         ○ NO  ⊙ YES
MAY THE CSR GENERATE REPORTS?                  ○ NO  ⊙ YES
MAY THE CSR PERFORM FINAL QA ON MESSAGE RESPONSES? ○ NO  ⊙ YES
DOES THE CSR QUALIFY AS AN EXPERT?             ○ NO  ⊙ YES
MAY THE CSR MARK A MESSAGE AS "NO RESPONSE NECESSARY?
DO THE CSR RESPONSES NEED QA                   ○ NO  ⊙ YES

GROUP PERMISSIONS

SELECT THE GROUP ADDRESS FOR WHICH THE CSR MAY RESPOND TO MESSAGES.

NONE
cyberesponse@____.net

CSR ADMIN

SELECT NEW TO ADD A NEW CSR. OR, SELECT A CSR TO UPDATE.

○ NEW
○ DWILSON
○ JENNYBOTTS
⊙ KARENMUSSON

ADMINISTRATIVE TASK – INTERNET BROWSER cyberesponse@____.net

| CATEGORY | CSRs | STANDARD RESPONSE | SIGNATURE | VIEW GROUP |

CSR PERMISSIONS

| NONE |
| DWILSON |
| JENNYBOTTS |
| KARENMUSSON |

HIGHLIGHTED CSRs ARE THE CURRENT CSRs THAT MAY RESPOND TO EMAIL ADDRESSED TO cyberesponse@____.net.

CLICK ON A CSR TO ADD OR REMOVE THE CSR FROM THE CURRENT LISTING. USING SHIFT+CLICK OR CTRL+CLICK WILL ALLOW MULTIPLE CSRs TO BE SELECTED OR DESELECTED.

CSR PERMISSIONS CAN ALSO BE ASSIGNED/REVOKED IN CSR ADMINISTRATION.

AFTER CSRs HAVE BEEN CHOSEN, PRESS "APPLY" TO SUBMIT THE CHANGES.

APPLY

GROUP ADMIN

SELECT A GROUP TO UPDATE.

⊙ cyberesponse@____.net

ADMINISTRATIVE TASKS - INTERNET BROWSER cyberesponse @_____.net

| CATEGORY | CSRs | STANDARD RESPONSE | SIGNATURE | VIEW GROUP |

CATEGORIES
BENEFITS
OTHER SERVICES
REPORTING
SYSTEM FEATURES
TEST

CSR PERMISSIONS
DWILSON
JENNY BOTTS
KARENMUSSON

SIGNATURE
NO SIGNATURES

STANDARD RESPONSES
1. THIS IS A STANDARD RESPONSE TO A SAMPLE MESSAGE.

GROUP ADMIN

SELECT A GROUP TO UPDATE.

⊙ cyberesponse@_____.net

GENERATE REPORTS

SELECT A REPORT

| REPORT NAME | REPORT CONTENTS |
|---|---|
| CATEGORY | • THE NUMBER OF RESPONSES PER CATEGORY |
| DAILY | • NUMBER OF MESSAGES RECEIVED AND RESPONSES SENT DURING A DAY.<br>• NUMBER OF MESSAGES WITHIN AND EXCEEDING QUALITY ASSURANCE STANDARDS |
| NO RESPONSE NEEDED | • MESSAGES THAT HAVE BEEN MARKED AS NO RESPONSE NECESSARY |
| OPEN MESSAGE | • MESSAGES THAT HAVE AN OPEN DIALOGUE STATUS |
| QA | • MESSAGES TO CSRs REGARDING QA |
| REPLIES | • AN EMAIL MESSAGE |

Fig. 26

OPEN MESSAGE SUMMARY

MESSAGE SENT TO cyberesponse@____.net

| STATUS | RECEIVED | CSR ASSIGNED | ORIGINATOR | SUBJECT |
|---|---|---|---|---|
| ▲ OPENED | 3/10/1997 | DWILSON | dwilson@____.net | SAMPLE MESSAGE |
| ▲ OPENED | 3/10/1997 | JENNYBOTTS | jbotts@____.net | TEST 03/10/97 |
| ▲ UNOPENED | 3/10/1997 | | jbotts@____.net | DO YOU ANSWER THE EMAILS? |
| ▲ UNOPENED | 3/10/1997 | | jbotts@____.net | CYBERESPONSE LOCATION |
| ▲ OPENED | 3/10/1997 | KARENMUSSON | jbotts@____.net | REPORTING |
| ▲ WAIT FOR EXPERT | 3/10/1997 | KARENMUSSON | jbotts@____.net | THRESHOLD |
| ▲ UNOPENED | 3/10/1997 | | kmusson@____.net | QUESTION ABOUT CYBERESPONSE |
| ▲ UNOPENED | 3/10/1997 | | kmusson@____.net | CYBERESPONSE SERVICE |
| ▲ OPENED | 3/10/1997 | KARENMUSSON | kmusson@____.net | INTERNATIONAL |
| ▲ UNOPENED | 3/10/1997 | | kmusson@____.net | _____ QUESTION |

TOTAL OPEN MESSAGES       10

[QUERY PAGE]

*Fig. 30*

REPLIES REPORT

COMPLETE FORM TO INDICATE THE MESSAGE ADDRESSES, THE CSR, THE TIME FRAME FOR WHICH THE REPORT IS TO BE GENERATED. PRESS "GET REPORT" TO RETRIEVE THE REPORT.

MESSAGES SENT TO

| ALL ADDRESSES |
| cyberesponse@___.com |

CSR

| ALL CSRs |
| JENNYBOTTS |
| KARENMUSSON |

FOR DATES:

⦿ RANGE (THE DATE(S) MESSAGE WAS RECEIVED)

FROM: [SEPTEMBER ▼] [1 ▼] [1996 ▼]

TO: [SEPTEMBER ▼] [30 ▼] [1996 ▼]

[GET REPORT]

○ CUMULATIVE

RESPONSE TIME REPORT

COMPLETE THE FORM TO INDICATE THE MESSAGE ADDRESS AND THE TIME FRAME FOR THE REPORT TO BE GENERATED.

MESSAGES SENT TO

⦿ cyberesponse@_____.com

FOR DATES:

⦿ RANGE (THE DATE(S) THE MESSAGE WAS RECEIVED)

FROM: [AUGUST ▼] [1 ▼] [1996 ▼]

TO: [SEPTEMBER ▼] [30 ▼] [1996 ▼]

○ CUMULATIVE

QA STANDARD

ENTER THE ACCEPTABLE NUMBER OF HOURS BETWEEN A MESSAGE BEING RECEIVED AND A REPLY BEING SENT:

[48]

[GET REPORT]

RESPONSE TIME REPORT

MESSAGES SENT TO cyberresponse@___.com
QA STANDARD: MORE THAN 48 HOURS BETWEEN MESSAGE RECEIPT AND REPLY EXCEEDS STANDARD
ALL DATES

SUMMARY

QA STANDARD

31 OF 31 RECORDS (100%) WITHIN QA STANDARD
0 OF 31 RECORDS (0%) EXCEED QA STANDARD

TIME BETWEEN RECEIVED AND OPENED

- AVERAGE: 8 HOURS
- TOTAL: 236 HOURS
- MAXIMUM: 93 HOURS
- MINIMUM: 0 HOURS

TIME BETWEEN OPENED AND REPLIED

- AVERAGE: 0 HOURS
- TOTAL: 1 HOURS
- MAXIMUM: 1 HOURS
- MINIMUM: 0 HOURS

TIME BETWEEN RECEIVED AND REPLIED

- AVERAGE: 1 HOURS
- TIME: 28 HOURS
- MAXIMUM: 3 HOURS
- MINIMUM: 0 HOURS

Fig. 33

| DETAIL | | | | TIME (IN HOURS) BETWEEN | | |
|---|---|---|---|---|---|---|
| | | | | RECEIVED & OPENED | RECEIVED & REPLIED | OPENED & REPLIED |
| MESSAGE NUMBER | RECEIVED | OPENED | REPLIED | OPENED | REPLIED | REPLIED |
| 54 | Sep 23 1996 16:43 | | | | | |
| 57 | Sep 25 1996 15:56 | Sep 25 1996 | Sep 25 1996 | 1 | 1 | 0 |
| 58 | Sep 25 1966 17:38 | Sep 25 1996 | Sep 25 1996 | 1 | 1 | 0 |
| 59 | Sep 25 1996 18:41 | Sep 25 1996 | Sep 25 1996 | 0 | 0 | 0 |
| 60 | Sep 25 1996 18:51 | Sep 25 1996 | Sep 25 1996 | 1 | 1 | 0 |
| 61 | Sep 25 1996 19:04 | Sep 25 1996 | Sep 25 1996 | 0 | 0 | 0 |
| 62 | Sep 25 1996 19:10 | Sep 26 1996 | Sep 25 1996 | 1 | 0 | 1 |
| 63 | Sep 26 1996 08:19 | Sep 26 1996 | Sep 26 1996 | 0 | 0 | 0 |
| 64 | Sep 26 1996 08:19 | Sep 26 1996 | Sep 26 1996 | 0 | 2 | 2 |
| 65 | Sep 26 1996 10:05 | Sep 26 1996 | Sep 26 1996 | 0 | 0 | 0 |
| 66 | Sep 26 1996 10:24 | Sep 26 1996 | Sep 26 1996 | 0 | 0 | 0 |
| 67 | Sep 26 1996 13:39 | Sep 26 1996 | Sep 26 1996 | 2 | | 2 |
| 68 | Sep 26 1996 13:40 | Sep 30 1996 | | 91 | | |
| 69 | Sep 26 1996 13:42 | Sep 26 1996 | Sep 26 1996 | 2 | 0 | |
| 70 | Sep 26 1996 13:45 | Sep 26 1996 | Sep 26 1996 | 2 | 0 | |
| 71 | Sep 26 1996 13:46 | Sep 27 1996 | | 19 | | |
| 72 | Sep 26 1996 13:52 | Sep 26 1996 | Sep 26 1996 | 2 | 0 | |
| 73 | Sep 26 1996 13:56 | Sep 26 1996 | Sep 26 1996 | 2 | 0 | |
| 74 | Sep 26 1996 13:56 | Sep 26 1996 | Sep 26 1996 | 3 | 0 | |
| 75 | Sep 26 1996 13:56 | Sep 26 1996 | | 2 | | |
| 76 | Sep 26 1996 13:56 | Sep 26 1996 | | 2 | | |
| 77 | Sep 26 1996 13:56 | Sep 30 1996 | Sep 26 1996 | 93 | 0 | |
| 78 | Sep 26 1996 13:56 | Sep 26 1996 | | 2 | | |
| 79 | Sep 26 1996 13:56 | Sep 26 1996 | Sep 26 1996 | 2 | 0 | |
| 80 | Sep 26 1996 13:56 | Sep 26 1996 | Sep 26 1996 | 2 | 0 | |

Fig. 34

ELECTRONIC MESSAGE MANAGEMENT SYSTEM

BACKGROUND AND SUMMARY OF THE INVENTION

The present invention relates to an electronic message management system and method, and more particularly, to an electronic message storage, tracking, management, and response method and system.

The number of Internet users continues to grow at an astounding rate. Accordingly, Internet Web sites have become an important way to communicate with customers. Internet Web sites are being used to send electronic message inquiries to customer service departments of many companies. Accordingly, as with traditional telephone customer service departments, customers expect timely responses to their e-mail inquiries.

An analysis was performed on the proficiency of companies in responding to e-mail inquiries received through their Web site. The study found that:

17% of the companies responded via e-mail;
27% of the companies did not respond to the e-mail inquiries;
8% responded via the U.S. postal service; and
48% of the companies did not have any mechanism for accepting e-mail inquiries.

Additionally, of the small percentage of companies actually responding to e-mail inquiries, many of those companies took 3–4 weeks to respond to e-mail inquiries, with many of the inquiries never being answered. Many popular Web sites generate tens of thousands of hits, and thousands of e-mail inquiries, per month. As the popularity of the Internet increases, the number of e-mail inquiries sent will continue to increase.

At the present time, electronic message inquiries are handled manually by customer service departments. In other words, the e-mail is sent directly to a customer service Mail server. The e-mail message inquiries are then read by a customer service representative who is assigned to respond to the e-mail inquiries. The customer service representative may either respond to the message or may refer the message to another customer service representative who is more qualified to answer the inquiry. Currently, the process of forwarding the messages to responsible customer service representatives (CSRs) is accomplished manually. In other words, either the forwarding CSR clicks the "forward" button to send the message to the responsible CSR or the e-mail inquiry is actually printed out and physically handed to the responsible CSR. The responsible CSR then responds to the e-mail inquiry.

This manual process of responding to electronic messages results in a lack of electronic message management and a failure to provide any type of quality assurance on the message responses. For example, in a traditional system, once an e-mail inquiry is received at the designated mail server a customer service representative may access that e-mail message by using any known e-mail program (e.g. Eudora). If the customer service representative cannot answer the message, he must refer that inquiry to another CSR that can answer the question. With these known systems, the CSR must "manually" forward the inquiry to another responsible CSR able to take the inquiry. The e-mail is "manually" forwarded, for example, by designating the e-mail address of the responsible CSR and clicking the "forward" button in the mail program. Once the responsible CSR receives the forward inquiry, he or she may respond to the inquiry.

Accordingly, these traditional system are not well suited to handle a large load of electronic message inquiries. The manual forwarding of inquiries to responsible CSRs may take a considerable amount of time when there are thousands of inquiries and where there are many different CSRs (e.g. one to take billing inquiries, one to take technical support inquiries, one to take dealer locator inquiries). The time needed to initially read each message, to determine who the responsible CSR is, to determine the location of the responsible CSR, and to forward the message to the responsible CSR for response, results in long response times.

Additionally, these traditional systems do not provide any efficient means to provide quality assurance and electronic message tracking. For example, once the responsible CSR responds to the message, it is sent to the customer without being reviewed for appropriate content. This lack of quality control may result in inappropriate, or inaccurate, responses being sent to customers and accordingly, damage to valuable customer relations.

Additionally, in these known systems, the manual forwarding of electronic message inquiries to responsible CSRs results in a lack of message status tracking. In these known electronic messaging systems it is virtually impossible to administer the status of the electronic message inquiries, to determine what the inquiries were about, who the responsible CSR is, which inquiries have been responded to, and which inquiries are still in need of attention. For example, as an illustration, assume that in one week Company "Fortune 500" receives 100,000 e-mail inquiries. Assume that the e-mail messages were distributed as follows:

25,000 messages were sent to 100 different technical support CSRs;
25,000 messages were sent to 100 different billing CSRs;
25,000 messages were sent to 100 different product CSRs;
5,000 messages were sent to 20 different dealer locator CSRs; and
20,000 messages were sent to 100 general CSRs.

With traditional e-mail messaging systems, the only way that these different CSRs can obtain access to the appropriate e-mail inquiry is to either:

1.) manually forward the e-mails to the responsible CSR;
2.) print out the e-mail message and physically deliver it to the responsible CSR; or
3.) have the original e-mail message sent directly to the different e-mail addresses of each CSR.

All of these methods would be inefficient for distributing e-mail inquiries to responsible CSRs and, accordingly, for the subsequent responding to the 100,000 e-mail messages.

Additionally, with these known systems, it would be virtually impossible to provide any administrative tracking or quality assurance on these 100,000 e-mail inquiries. Once the e-mail inquiry has been forwarded to the responsible CSR, administration could not efficiently track the status of the inquiry (i.e. responded to or still pending) or the content of the responses being sent. In these known systems, the individual CSR would have to individually inform administration of the status of each assigned e-mail inquiry and forward each response to administration for approval.

As the popularity of the Internet increases, electronic message communication will become a standard and indispensable form of communication. Accordingly, companies need to implement e-mail communication with their customers. Additionally, many companies are, and will be, receiving thousands of electronic message inquiries per week. Accordingly, there is a need for an electronic message management system that provides for the efficient storage, administration, tracking and reporting of customer inquiries. Additionally, an electronic message management system is needed which will allow the generation of timely responses to electronic message inquiries. The present invention provides such an electronic message management system that provides the following advantages over existing e-mail programs:

1.) provides an automatic interface to a structured database for forwarding all electronic messages;
2.) provides access to the database by authorized CSRs, from remotely located computers;
3.) stores the electronic messages by predetermined attributes (e.g. time the inquiry was received, the e-mail address of the customer, the status of the message) so that the e-mail inquiries can be retrieved by any, or all, of the attributes;
4.) allows administrators to provide quality assurance reviews on selected responses before sending the message to the customer;
5.) provides updates to the interface based on CSR or administrator activities so that the status of all electronic messages are current;
6.) provides a list of authorized CSRs that may have access to the electronic messages in the interface, and allows customized settings of individual CSR privileges;
7.) provides security against hackers and viruses;
8.) provides a historical record of all electronic messages from each customer;
9.) interfaces the CSRs to a database containing predefined, standard, responses for frequently asked questions;
10.) allows the forwarding of the message to the relevant expert, the database being updated to indicate that the message has been referred to an expert;
11.) tracks the responses to all electronic message inquiries and updates the database accordingly;
12.) provides the ability to efficiently add additional CSRs, delete CSRs, add standard responses, and to provide custom reports;
13.) allows categorization of all electronic inquiries/ messages by client-defined categories;
14.) allows the reporting of the average response time of responses; and
15.) allows the monitoring of CSRs.

The present invention is preferably accomplished by: receiving electronic messages at an electronic network; forwarding the electronic messages to a database; storing the electronic messages based on predetermined message attributes; interfacing a customer service representative computer to allow electronic access to the electronic messages; transmitting one of the electronic messages from the database from the customer service representative computer based on one of the predetermined message attributes; displaying the transmitted message at said customer service representative computer; responding to the transmitted message; and updating the database to indicate that the transmitted message has been responded to. The present system also allows for the administering and updating of the database according to specific application needs.

In addition to the features mentioned above, objects and advantages of the present invention will be readily apparent upon a reading of the following description.

BRIEF DESCRIPTION OF THE DRAWINGS

Novel features and advantages of the present invention, in addition to those mentioned above, will become apparent to those skilled in the art from a reading of the following detailed description in conjunction with the accompanying drawings wherein similar reference characters refer to similar parts and in which:

FIGS. 10–34 illustrate example screen shots from various pages of a preferred system of the present invention.

DETAILED DESCRIPTION OF PREFERRED EMBODIMENT(S)

The preferred system herein described is not intended to be exhaustive or to limit the invention to the precise forms disclosed. They are chosen and described to explain the principles of the invention, and the application of the method to practical uses, so that others skilled in the art may practice the invention.

Figure 1:
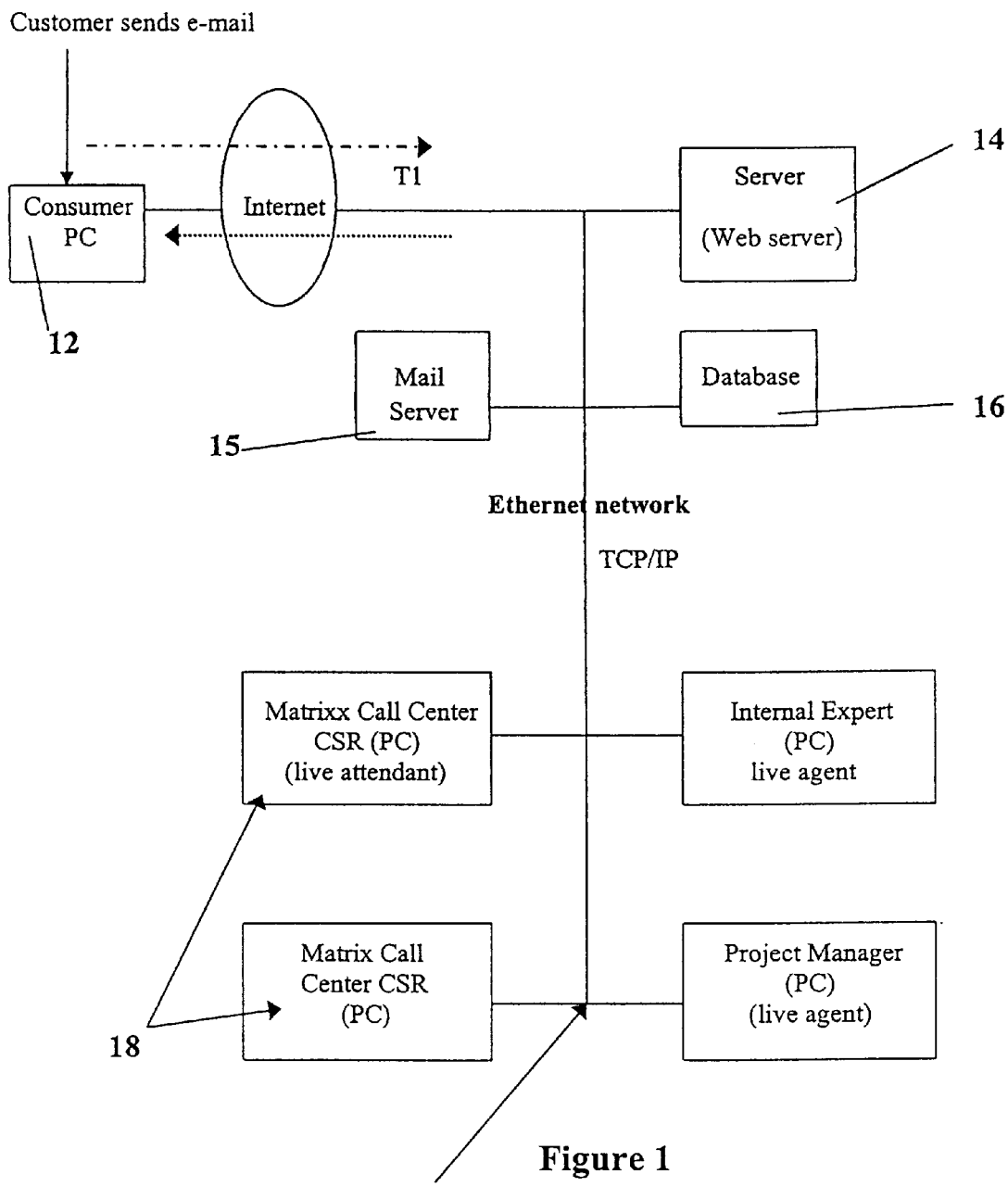
FIG. 1 illustrates one embodiment of the e-mail management system of the present invention.

FIG. 1 illustrates one embodiment of the electronic management system 10 of the present invention. The system is preferably comprised of a server 14, a computer running mail server software 15, a database 16, and a customer service representative (CSR) computer 18. (A mail server 15 would not be needed if all electronic messages were submitted via Web page forms).

It is preferred that the server 14, the mail server 15, the database 16, and the CSR computer 18 be connected by a network. This network, preferably, makes up the call center network 10 of the present invention. For example, the network 10 may be an ethernet network based on Transfer Connect Protocol/ Internet Protocol (TCP/IP), although it is appreciated that other protocols may be used. The network 10 may also be part of a Wide Area Network (WAN). It is also appreciated that the components of the present system may be variously arranged. For example, the server 14, acting as a Web server, may also be configured as the mail server. However, in the preferred embodiment, as illustrated in FIG. 1, the mail server 15 is a separate computer from the server 14, and linked by the network.

The server 14 is generally a large capacity computer programmed for interfacing the CSR computer 18 and the database 16. The server 14 is preferably a computer configured, or programmed, with Web server software. The server 14, configured with Web server software (i.e. a "Web server"), serves as an interface between the CSR's computer 18, configured with Web browser software, and the database 16.

Typically, the network is connected by a T1 line to the Internet. Again, it is preferred that the server 14 be configured with Web server software with the capability to store, and transfer, Hypertext Markup Language (HTML) files and/or other scripts. As will be discussed, the CSR user interfaces are, preferably, viewed through a Web browser which accesses HTML code, or files, stored at the server 14.

The customer's computer 12 is typically a personal computer having a modem for communicating with the call center network 10 facility, through the Internet. There are many advantages of using the Internet to communicate with the call center network, e.g., the customer has access to low cost clients (i.e. Web browsers), and the Web allows standard user interfaces and the ability to work across different platforms and applications.

In the preferred embodiment, the customer sends an electronic message, or inquiry, through the Internet, which finds its way to the mail server 15. (Electronic messages include, but are not limited to, e-mail messages). If e-mail, the mail server 15 receives and accepts the electronic message (if the message is submitted from a Web page form it is interface directly to the database 16). The mail server 15 is preferably a mail server program (e.g. Microsoft Exchange Server) that may either be located on the server 14, or a separate computer electronically linked to the server 14 (i.e. the server 14 may be configured with both Web server software and mail server software or the server 14 configured with Web server software may be electronically connected to another computer 15 configured with mail server software).

In any case, the call center network 10 is configured to automatically transfer the received electronic messages to the database 16 for storage (i.e. without an intermediate manual step). Automatic transfer of the electronic messages may either be the automatic forwarding of the messages or having the messages pulled by the database. For example, a customer, using an e-mail client (e.g. Eudora) located on his computer 12 sends an e-mail message to companysupport@matrixx.net. The e-mail message travels through the Internet and enters the call center network 10. The e-mail message is routed to the mail server 15 (This is accomplished through known mail protocols, for example, the mail server 15 is configured to accept and send Internet e-mail. When a mail message arrives it is sent to the server defined as the mail server in the Domain Name Service and MX records). The database 16 is programmed to automatically retrieve the e-mail messages from the mail server. In other words, a program may be written that retrieves predetermined received email messages from the mail server and delivers them to the database 16 for storage. This program may be written in a number of different languages including C++ or SQL. The key being to provide automated integration between the mail server, the Web page, and any SQL stored procedures.

It should be appreciated that electronic messages from customers may be received in forms other than through traditional e-mail clients. For example, an electronic message may be sent from on-line forms embedded in company Web pages. These electronic messages may also be sent to the Web server 14, and stored in the database 16. For example, company Web sites may have on-line forms for submitting data or customer inquiries. These forms submit the message to a program, preferably written in C++, on the Web Server 14. Once the program receives the message, it stores the message in the database 16.

The database 16 is generally a storage area for the received electronic messages, including e-mails, and any other data required by the system (e.g. CSR data). It is preferred that the database 16 be a complete database management system (DBMS) which acts to organize and standardize data retrieval and storage, and is controlled by a language that helps to manipulate the data and allows querying of the database (e.g. SQL).

Although the database 16 may be a "flat file" it is preferred that the database 16 be a relational database. A relational database is a database that stores the information in tables, and where there are rules that define the relationship between the tables. Generally, the tables in a relational database are separated by different entities (e.g. all received e-mail messages, all data on CSRs, and predefined CSR standard responses). Generally, each row of a database table defines a subset of that particular entity where each column of that table defines a specific attribute, or category, for that entity. For example, a table storing all received e-mail messages may be stored as one table or entity. One row may be designated for each separate e-mail message where the message is given specific attributes defined by each column of that row (e.g., the time the message was received or the status of the message).

Figure 2:
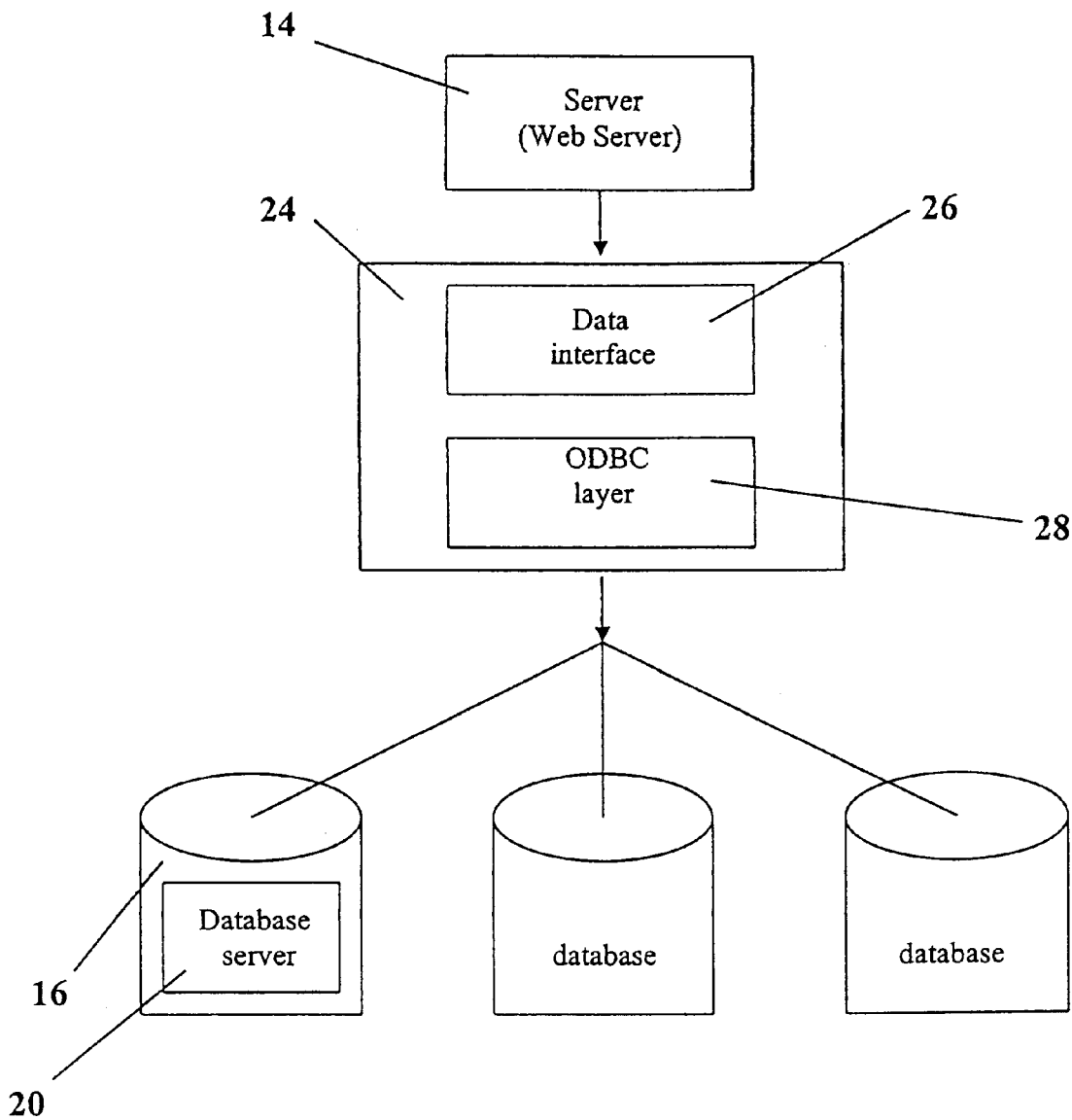
FIG. 2 illustrates a block diagram illustrating one embodiment of the interface between the Web server and the database.
Figure 3:
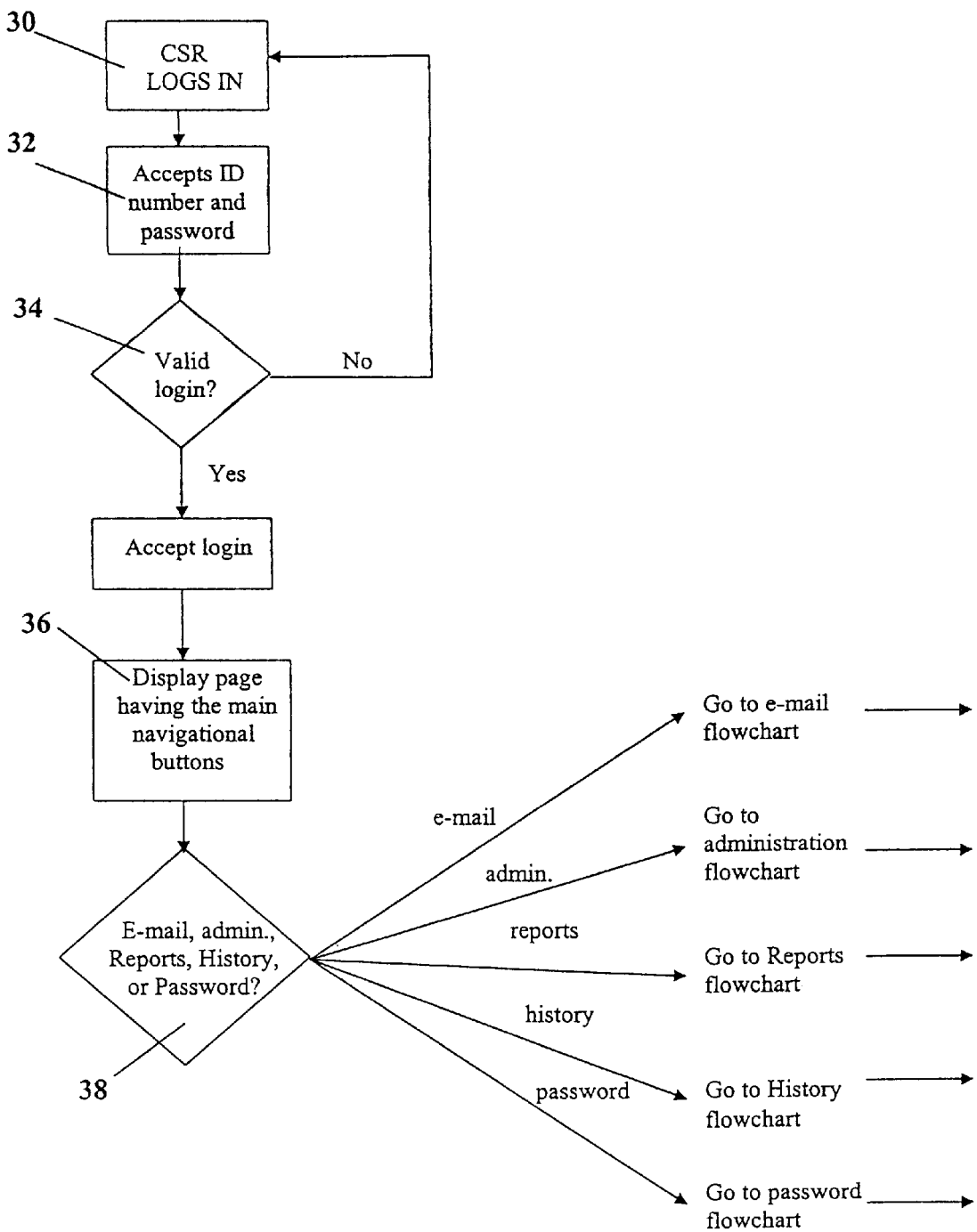
FIG. 3 illustrates a flow chart depicting the main operational steps of the e-mail management system.

FIG. 2 illustrates a block diagram illustrating one embodiment of the interface 24 between the Web server 14 and the database 16. The Web server 14 may be connected to more than one database 16. The server 14 is adapted to interface with the database 16 so that the CSR may access, and retrieve, the data residing on the database 16. For example, a server 14, acting as a Web server 14, generally consists of HTML files and electronically communicates with the CSR computers 18 using HyperText Transfer Protocol (HTTP). When a Web page is requested by the Web browser, HTML files are sent from the Web Server 14 to the CSR Web browser via HTTP. When data from the database 16 is needed, the Web page is programmed to retrieve the data from the database 16.

Accordingly, the server 14 and the database 16 must be integrated for proper communication. However, in many cases the server 14, acting as an interface to the database 16, cannot communicate with standard databases without an interface 24 that maps the incoming query to the server 14 to the appropriate semantics in the database 16.

In many databases today, Structured Query Language ("SQL") is used as the industry standard. SQL is a data language designed for creating, manipulating, and controlling relational databases. In order for a Web Server 14 to communicate with a database, a program extension 26 may be needed that converts the requests for data from the Web server 14 to a form that the database 16 will understand. For example, if the database 16 is a SQL database, the programmed program extension 26 will convert the data request from the Web Server 14 to SQL so that the database 16 will understand. However, in the preferred embodiment a program extension 26 is not required. In the preferred embodiment, the Web Server speaks directly to the database with Internet Database Connector files ("IDC" files) which allow Web pages to interface with the data in the database 16.

Additionally, in the preferred embodiment, an Open Database Connectivity (ODBC) layer is also programmed into the call center network 10. ODBC is a standard interface between the database 16 and an application trying to access the data in the database 16. Basically, the ODBC layer 28 allows any front end application to access the database 16 (in other words, the ODBC interface 28 is a program that provides a uniform way of calling data request to a database 16).

Accordingly, in the preferred embodiment, a data request from the Web server 14 is sent via IDC files, which use ODBC-compatible SQL, to the ODBC interface 28. The ODBC layer 28 converts the ODBC SQL calls into the predetermined database 16 native calls and then performs the database 16 interaction. The ODBC layer may also return the results of the data queries in a uniform way to the Web server 14.

The operation of the invention can be understood with reference to the flowcharts of FIGS. 3–9 and corresponding screen shots illustrated in FIGS. 10–34. The flowcharts of FIG. 3–9 describe the operational flow of one example system of the present invention. Screen shots from various stages of the system flow are depicted in FIGS. 10–27, however not all screen shots have been provided.

As discussed above, customers submit electronic message inquiries (e.g. e-mail) to the call center network 10. As discussed, the electronic messages are automatically transferred to a database 16 according to a predetermined format. Accordingly, the CSRs must access the electronic messages stored on the database 16 and respond to the inquiries.

A CSR accesses the database 16 from a computer station 18 electronically connected to the server 14. It is preferred that the CSR stations 18 are connected to the server 14 via a TCP/IP network, however, it should be understood that other network and data transfer protocols may suffice. As discussed, the server 16 is a computer that interfaces the CSR computer 18 with the database 16. It is preferred that the server 16 be configured with Web server software that allows the maintenance of HTML files, i.e. Web pages, that are used as interfaces to the database 16 (The following explanation of the invention and the flowcharts assume HTML as the preferred file format of the user interfaces although other formats may be used. Accordingly, the server 14 in the following explanation will be configured with Web server software, i.e. a Web server 14).

To access the database 16, a CSR points his Web browser to the appropriate address (e.g. a URL 13) of the starting address of the call center interface files located on the Web server 14. The Web server 14 transmits the HTML files of the CSR login page to the requesting CSR. (See the screen shot of FIG. 10.) The CSR then logs in with his ID and his password block 30. A program then checks to make sure the ID and the password are of a required form block 32 and sends the data to the database to make sure the CSR is allowed access block 34. It is preferred that an ID and password checking program be embedded in the HTML. For example a script is sent to the browser where it is subsequently run by the browser running on the CSR computer 18.

If the ID and password are of a required form, they are sent to the database to confirm the CSR may access the messages. If the CSR is authorized, the HTML files informing the user of authorized access are sent to the CSR browser (see FIG. 11). Upon clicking the "continue button" 17, the main navigational page (see screen shot of FIG. 12) are sent to the CSR computer 18. The main navigational page is displayed block 36 via the Web browser at the CSR computer 18. The call center interface may be programmed so as to require the changing of CSR passwords after a predetermined time. The main navigational page provides links, to HTML, or Web, page interfaces that allow the CSR to perform one of the main functions of the call center system 10. The CSR may opt to:

1.) access and process the received electronic messages;
2.) provide administrative functions;
3.) create detailed reports;
4.) view the history of the received electronic messages; or
5.) change the passwords of the CSRs.

Figure 12:
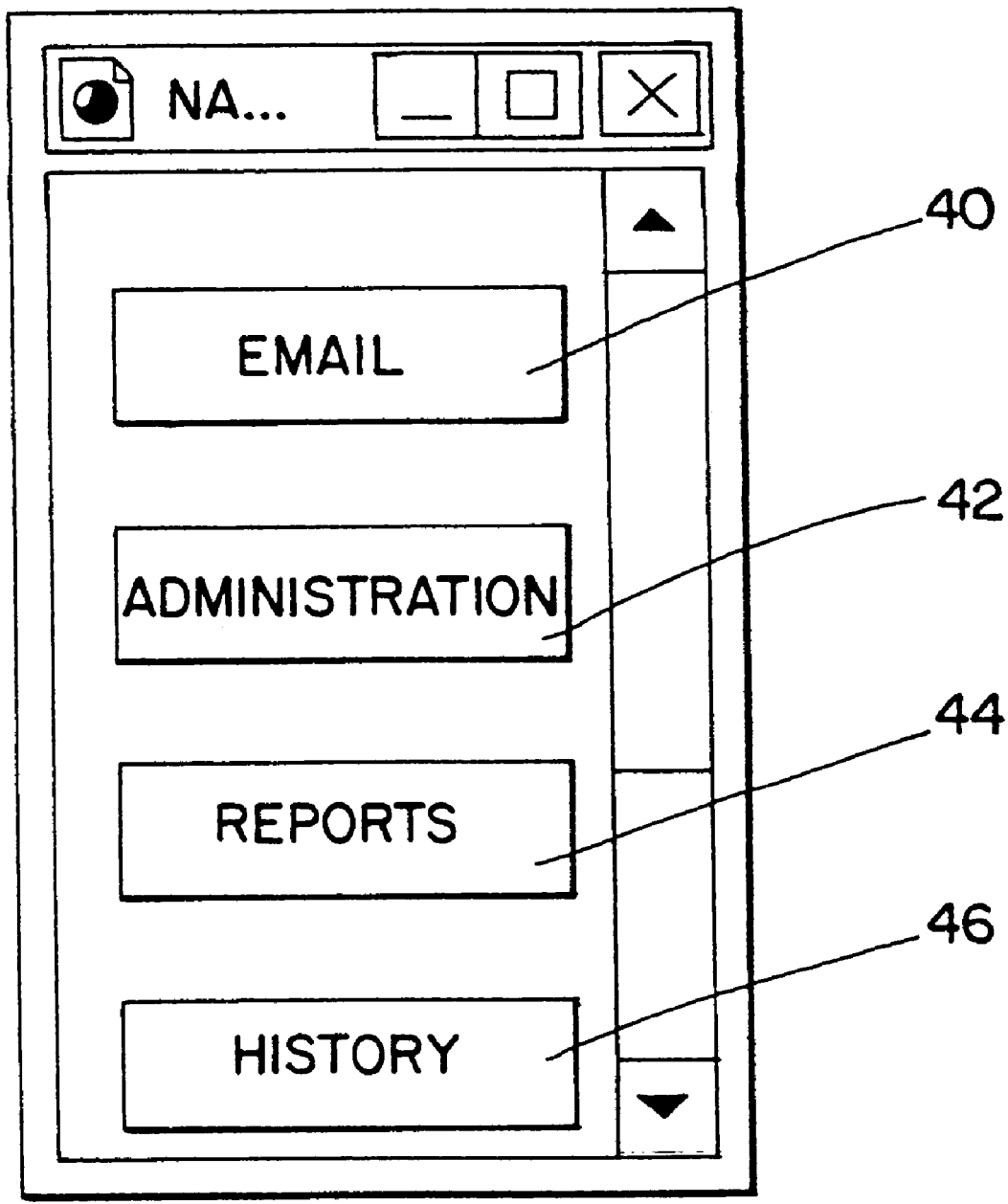

The CSR selects one of these options block 38 by clicking on the appropriate link in the main navigational page as illustrated in FIG. 12. For example, if the CSR wants to respond to e-mail messages he clicks on the "e-mail" link 40; if he wants to administer the system he clicks on the "Administration" link 42; if he wants to view a report on system statistics he clicks on the "Reports" link 44; if he wants to retrieve a history report he clicks on the "History" link 46; if he wants to change passwords he clicks on the "Password" link and if he wants to process mail, he clicks on the "Process Mail" link.

Figure 4A:
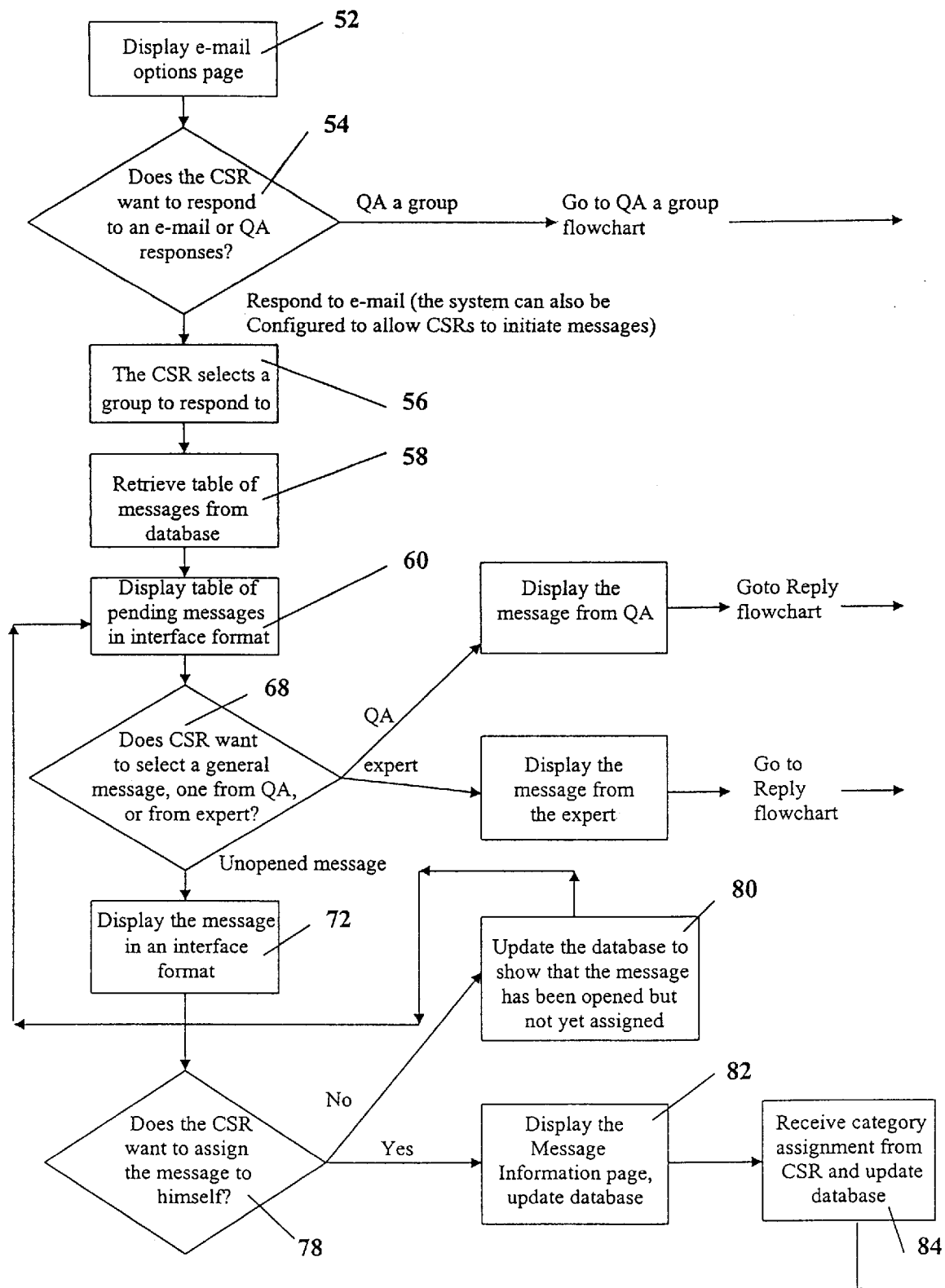
FIG. 4A illustrates a flow chart depicting the main steps for accessing and responding to e-mail messages.
Figure 4B:
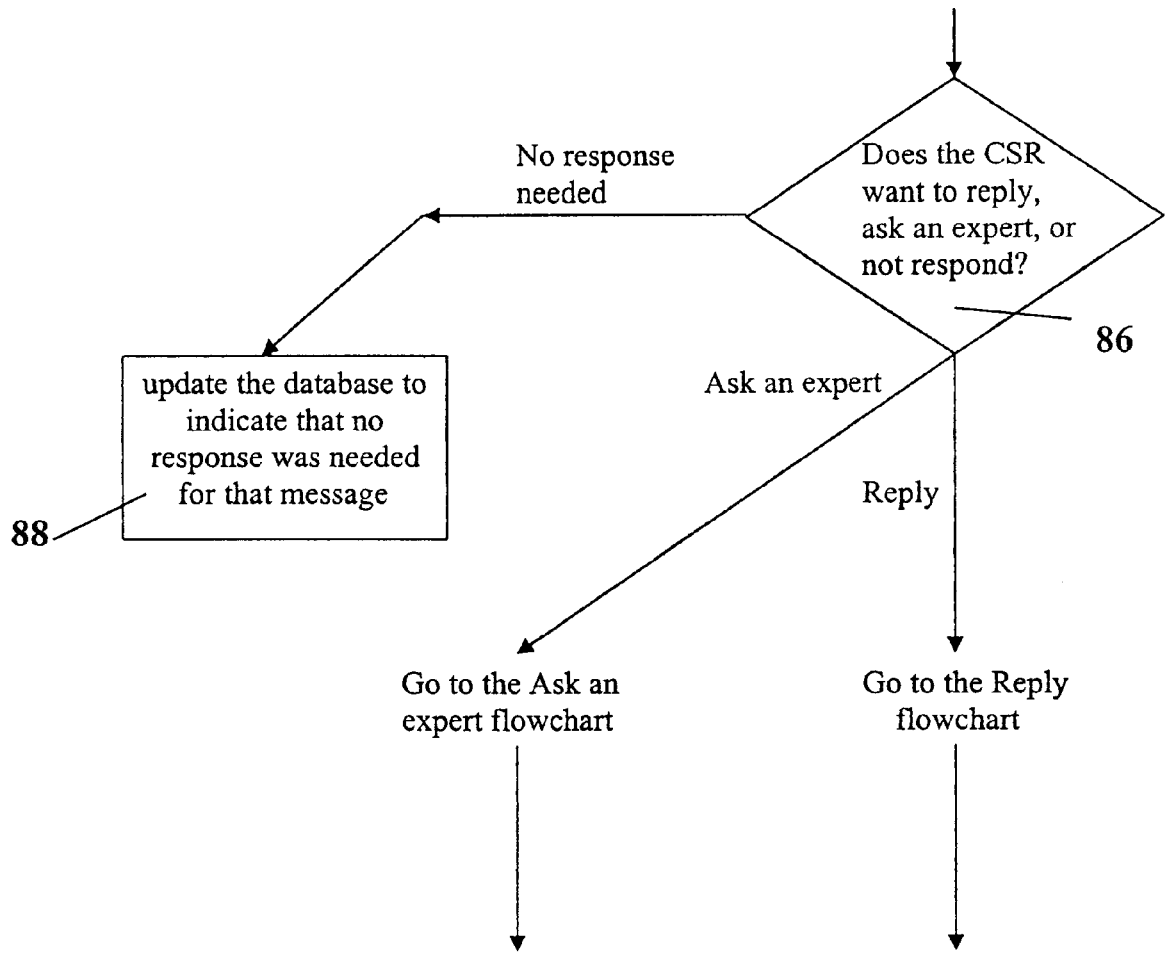
FIG. 4B illustrates a flow chart depicting the choices available to a CSR when handling e-mail messages in the system of the present invention.
Figure 13:
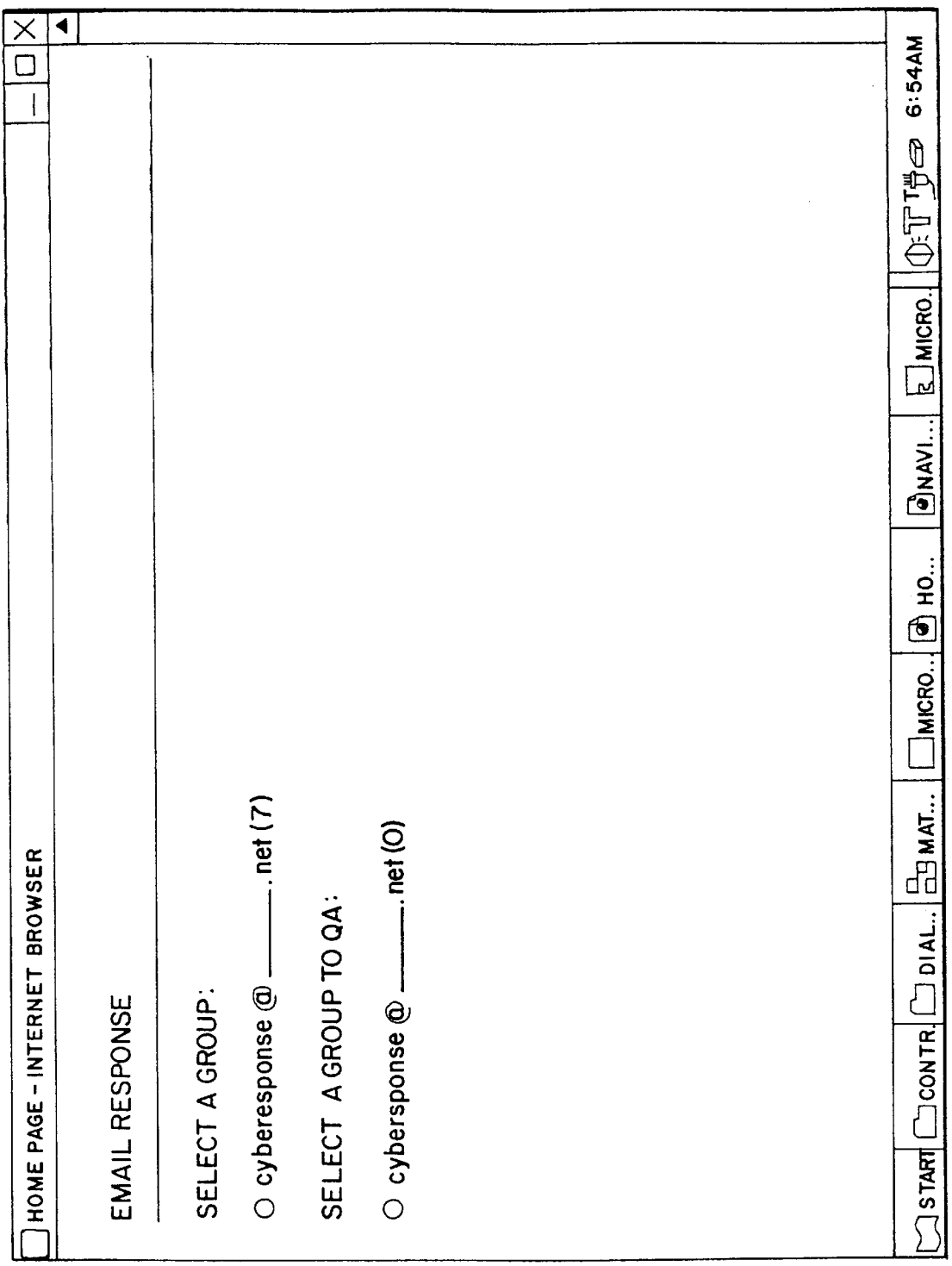

By clicking on the "e-mail" link 40 on the main navigational page, the database is queried to find which e-mail addresses the CSR may respond to and how many e-mails are waiting response. The results of the query are used to create the HTML file of the "E-mail Response" page. The "E-mail Response" page is sent to the CSR computer 18 from the Web server 14. (FIGS. 4A and 4B illustrate a flow chart depicting the main steps for accessing and responding to e-mail messages.) Once the HTML files are received at the CSR computer 18, the "E-mail Response" page, illustrated in FIG. 13, is displayed block 52 via the Web browser.

The E-mail Response page preferably gives the CSR the option of either:

1.) selecting a group of e-mail messages to respond to if the CSR has permission to respond to the received electronic messages; or
2.) selecting a group of e-mail messages to provide quality assurance (QA) reviews block 54.

E-mail messages are preferably grouped according to the e-mail addresses where the inquiry was sent. For example, all e-mail messages sent to a particular e-mail group are all preferably grouped together, stored together in the database 16, and accessed together. For example, in FIG. 13, there is only one group, "cyberesponse@matrixx.net". It is preferred that only the CSR groups to which each CSR has access be listed on the retrieved page. It is important to note that many CSRs (each linked by a computer 18) can respond to a single address/group. Setting CSR privileges to groups is discussed in further detail below.

If the CSR wishes to access and respond to e-mail messages, the CSR selects a group to respond to block 56. By selecting a group, the corresponding electronic messages received, and queued, for that group are retrieved block 58 from the database 16 and sent to the CSR computer 18 where they are displayed via HTML block 60. An example of a "Queued Messages" page is illustrated in FIG. 14. In the example page of FIG. 14, the retrieved messages are categorized by:

1.) message number;
2.) response number;
3.) the status of the message;
4.) whether the message has been assigned;
5.) when the message was received;
6.) who sent the message, including the customer's e-mail address; and
7.) the subject of the message.

It is preferred that the messages be separated into three different subgroups: the General message subgroup 62, the QA message subgroup 64, and the Expert message subgroup 66. The QA message subgroup contains all the messages that are awaiting QA review or messages denied by QA. All the messages in the Expert message subgroup are messages that are awaiting expert response or have been answered by an expert. The General message group contains all other messages that are still in queue. As illustrated in FIG. 14, the status of the QA messages are either "From QA" or "Pending QA". Messages with the "From QA" status indicate that the message has been reviewed and denied by a CSR with QA privileges. Messages with the "Pending QA" status indicate that the message has not yet been reviewed. Similarly, the status of the Expert messages are either "From Expert", indicating the expert has responded to the CSR's inquiry, or "Wait for Expert", indicating the CSR is still waiting for the expert to respond. Messages in the General message subgroup 62 may indicate to which CSR the message has been assigned.

A CSR may have the option to retrieve messages from either the General message subgroup 62, the QA message subgroup 64, or the Expert message subgroup 66 (block 68). If the CSR wishes to respond to a message that has not yet been opened or assigned, the CSR may click on a link 70 of a message that has a status of "Unopened" and "Unassigned". Upon clicking such a link, the message is retrieved from the database 16 (the database 16 being updated to indicate the message has been opened) and sent to the CSR computer 18 where it is displayed via the Web browser block 72.

Upon clicking on an unassigned e-mail message to review, the CSR is given the option to either:

1.) assign the message to himself, or
2.) return to the queued message page FIG. 14 without assigning the message block 78.

If the CSR does not wish to assign the message to himself, the CSR is returned to the queued message page. If the CSR wishes to assign the message to himself, the CSR clicks on the "Assign Message to Me" link. The database 16 is updated to indicate that the message has been assigned block 82. Upon assigning the message, the CSR is sent another HTML page which contains text asking the CSR to assign a category to the message block 84. See FIG. 15. Upon assigning a category(s), the database 16 is updated to reflect which categories the message has been assigned. Once a category is assigned to the message, CSR is given the option to either respond to the message, refer the question to an expert, or not respond to the message block 86.

If the CSR indicates that a response is not needed for a particular message, the CSR so indicates and the message is removed from the queued message table and the database is updated to indicate the message did not need a response block 88.

Figure 5:
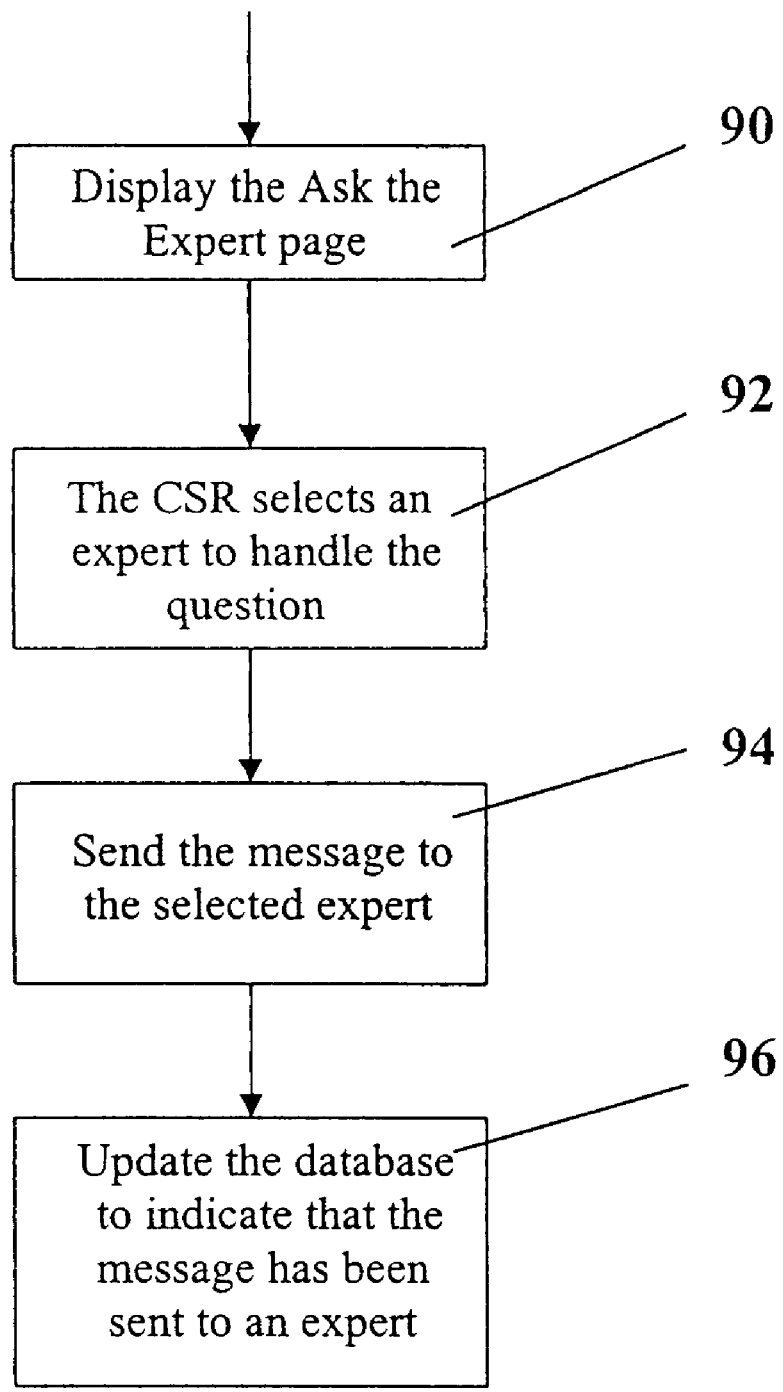
FIG. 5 illustrates a flow chart depicting the steps for forwarding a message to an expert.
Figure 16:
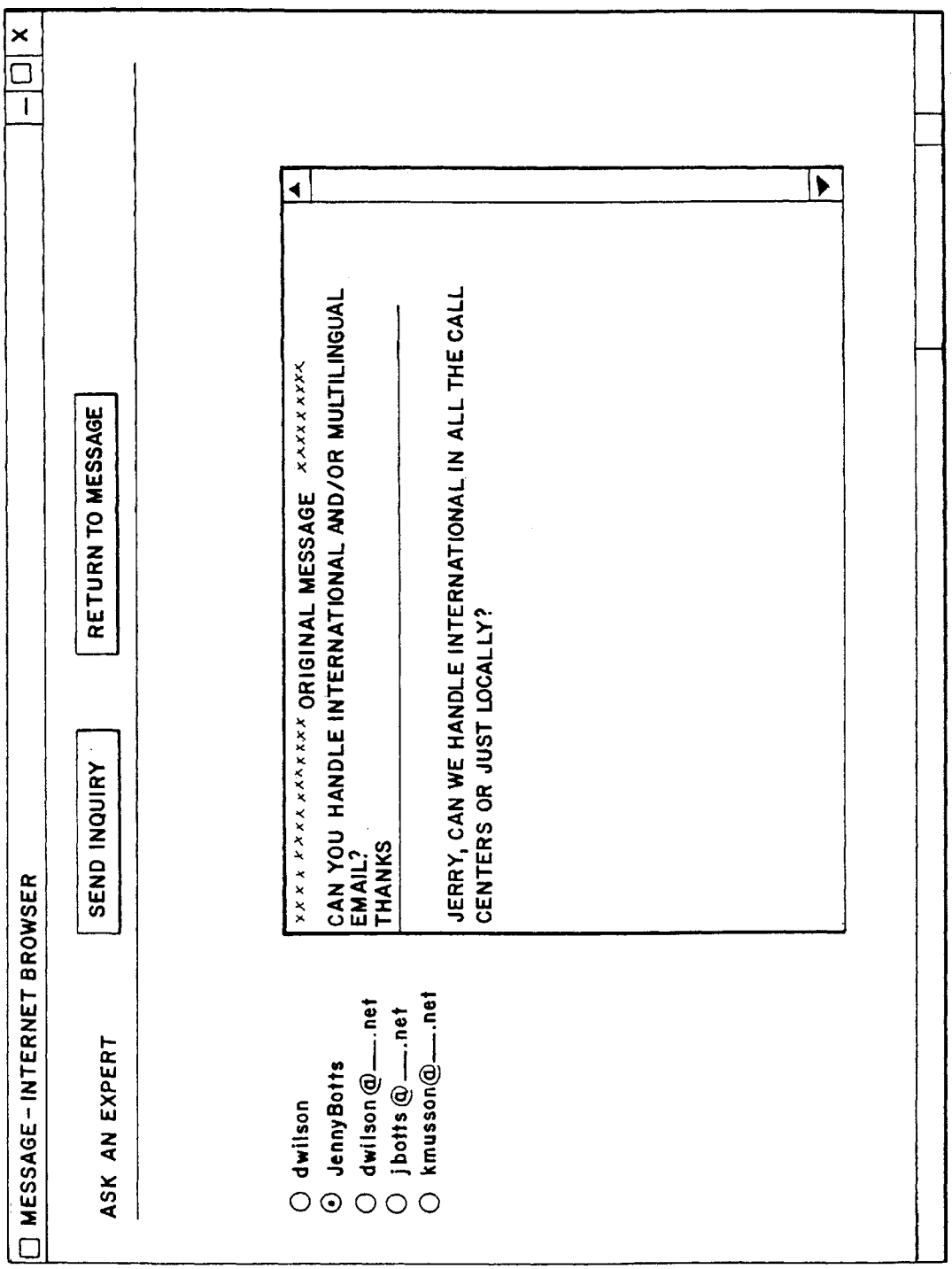

If the CSR wishes to refer the message to an expert more suited to respond to the inquiry, the CSR clicks on the appropriate link. FIG. 5 illustrates a flowchart of the steps for referring a message to an expert. An HTML page is sent to the CSR block 90 requesting expert referral that asks the CSR to select an expert to take the message (see FIG. 16 illustrating an example screen shot). The CSR then selects an expert and refers the message to the designated expert block 92 and 94. The database 16 is then updated to indicate that the message has been referred to an expert and that it is pending response from that expert block 96. Once the expert reviews and responds to the message, the database 16 is updated to indicate that the expert has responded to the message, i.e. "From Expert". An expert is preferably a CSR that has been given expert privileges or a designated expert outside the E-mail management system, as will be discussed below. Accordingly, the expert accesses the management system via a computer configured similarly to the CSR computer 18 (or if outside the E-mail management system, receives and replies to expert inquiry via standard Internet E-mail).

Figure 6:
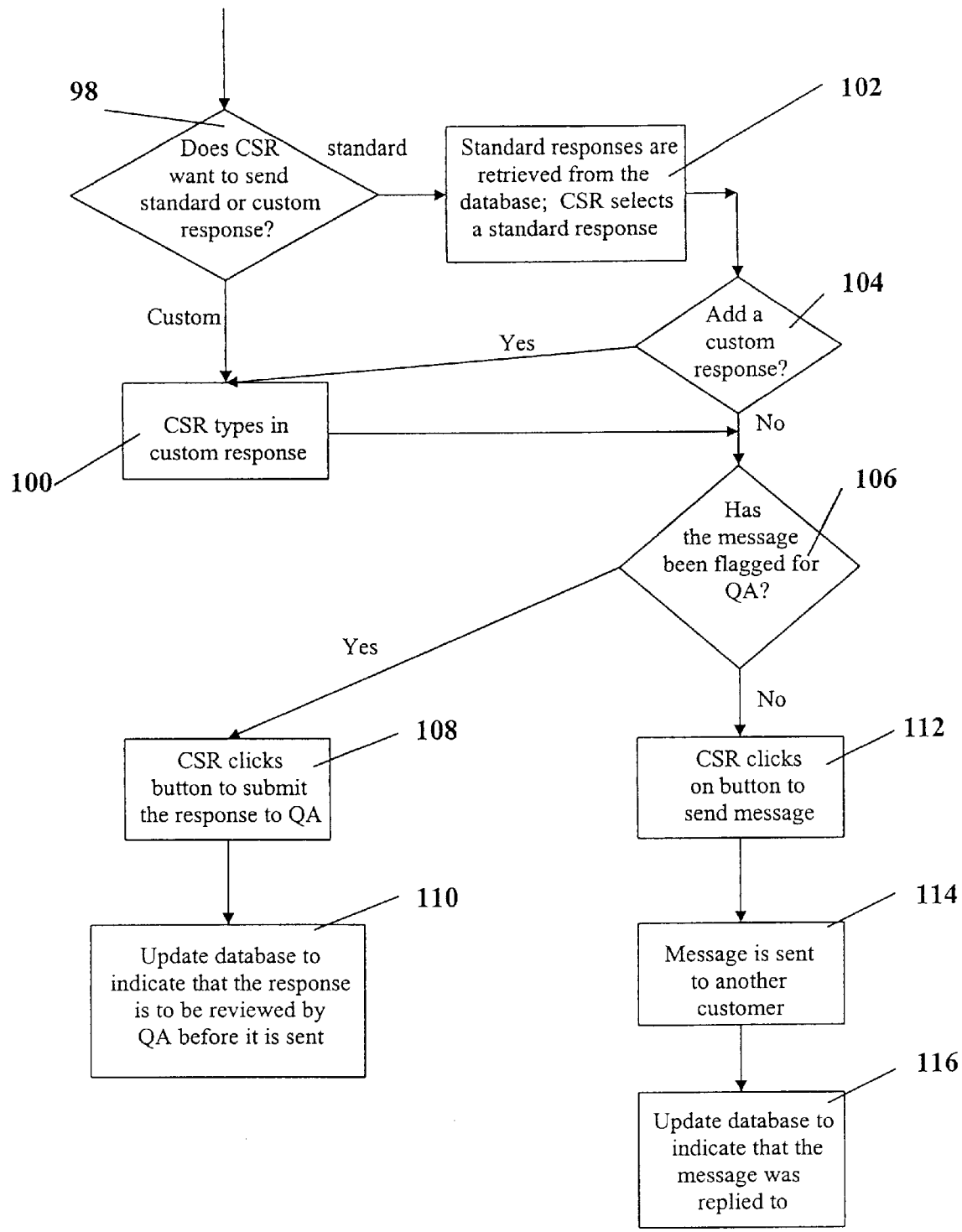
FIG. 6 illustrates a flow chart depicting the steps needed for replying to an e-mail message.

From the page illustrated in FIG. 15, the CSR may wish to respond to an assigned message rather than referring it to an expert. FIG. 6 illustrates a flow chart depicting the steps needed for replying to an e-mail message. The CSR will have the option of providing a custom response, a standard response, or both, to the inquiry blocks 98–104. The standard responses are stored and retrieved from the database 16. They are preferably indexed, and retrieved, by the particular group, category, or keyword of the message (FIG. 17 illustrates a screen shot listing example standard responses). Providing standard responses to frequently asked customer questions reduces the time required to respond to many of the customer inquiries.

The system 10 is programmed to determine whether the response requires QA review block 106, prior to the message being sent to the originating customer. As will be discussed in greater detail below, the administrator of the system may designate responses from certain CSRs as requiring QA review (discussed in greater detail below). In other words, all responses of designated CSRs must be given a QA review before their responses are sent to the customers. This feature allows the monitoring of CSR responses. This is especially important when training CSRs or when certain CSRs have a discourteous service record. If the response requires QA review, the response is flagged for QA review and the database 16 is updated to indicate that the stored response is to be reviewed and approved before being sent blocks 108 and 110. If the response does not require QA review, the message is sent to the customer and the database 16 is updated to indicate that the message was responded to blocks 112–116.

Figure 7:
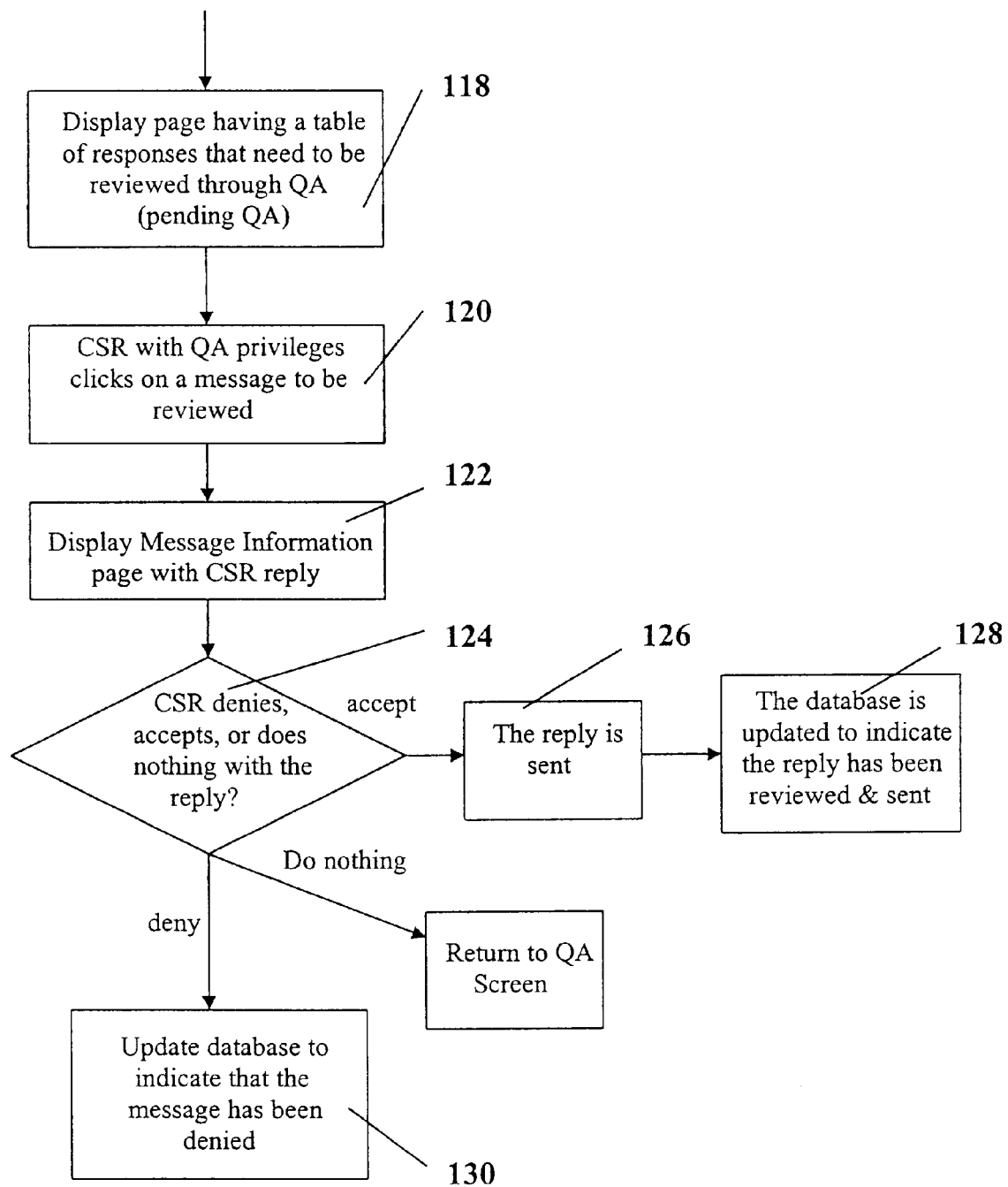
FIG. 7 illustrates a flow chart depicting the steps for providing a quality assurance review of e-mail responses.

As discussed above, a CSR with QA privileges may opt to provide a QA review on the CSR responses as opposed to responding to a message block 54. FIG. 7 illustrates a flow chart depicting the steps for providing a quality assurance review of e-mail responses. Once a CSR indicates that he wishes to review submitted CSR responses that are in queue, an HTML page is sent to the CSR computer 18 containing a table of responses that must be reviewed (the responses are retrieved from the database 16) block 118. FIG. 18 illustrates an example screen shot of a page listing messages to be given QA review.

The CSR may then click on a message to review block 120. An HTML file is sent to the CSR computer 18 that, preferably, displays the text of the message, the response formulated by a CSR, and other message data block 122. This data being retrieved from the database 16. Upon QA review, the reviewing CSR may accept or deny the response block 124. If the response is accepted, it is sent to the customer and the database 16 is updated to indicate that the customer message was reviewed and replied to blocks 126, 128. If the response is denied, the QA CSR sends the denied message back to the CSR with an explanation and a recommendation of how to respond to the inquiry. The database 16 is updated to indicate that the response has been reviewed and denied block 130.

Figure 8:
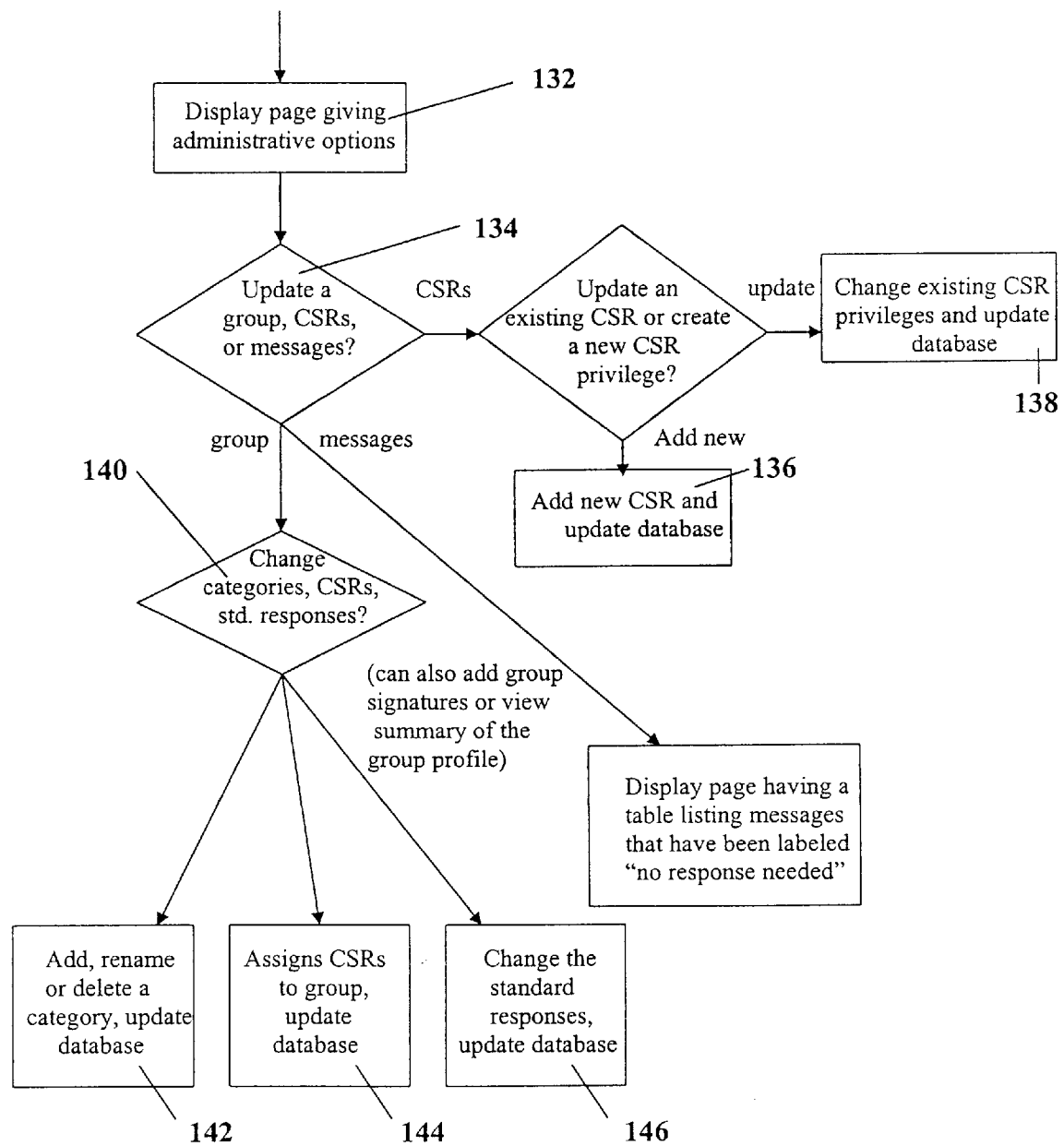
FIG. 8 illustrates a flow chart depicting the steps for administering the e-mail system of the present invention.
Figure 19:
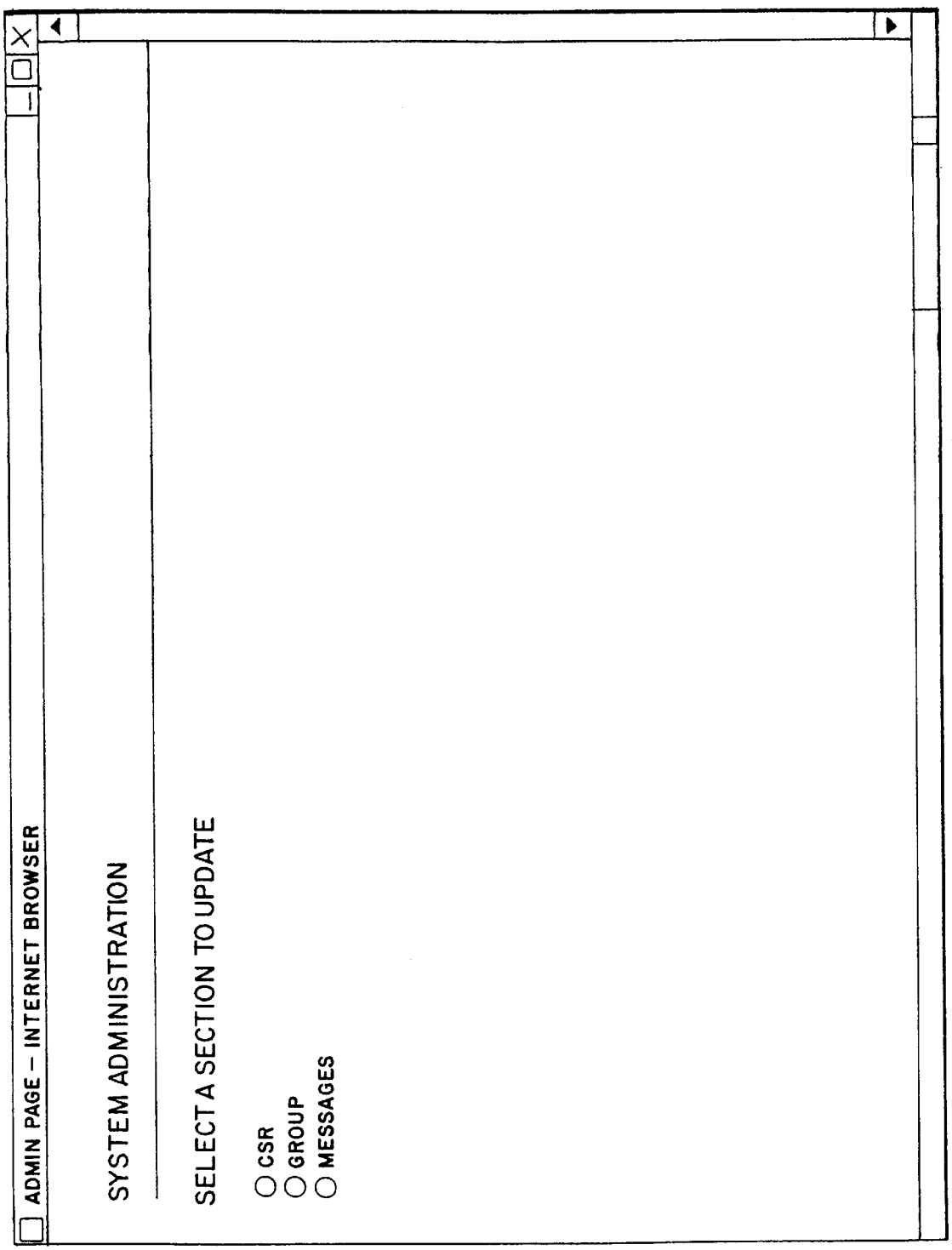

As previously discussed, a CSR, with administrative privileges, has the option to perform administrative duties on the electronic message management system. The administrative CSR may perform administrative functions by clicking on the appropriate link in the main navigational page block 38 as illustrated in FIG. 12. Once the administrative CSR clicks on the administrative link, an HTML file of the main administrative options page is sent to the CSR block 132, located at a CSR computer 18 (FIG. 19 illustrates an example screen shot of the main administrative options page of the present invention). FIG. 8 illustrates a flow chart depicting the steps for administering the electronic message system of the present invention.

From the main administrative options page FIG. 19, the CSR may elect to update message groups (these groups preferably consisting of a number predetermined e-mail addresses), update CSR data, or update a group of messages block 134. In updating CSR data, the administrative CSR may add new CSRs block 136 or change existing CSR privileges block 138. FIG. 20 illustrates an example screen shot for adding CSRs and updating CSR privileges. Again, these screen shots are preferably HTML files, or pages, displayed with a Web browser located at the CSR computer 18. As illustrated in FIG. 20, the administrative CSR may change CSR passwords, update CSR privileges, and give permissions to selected groups the CSR may respond to. It is also preferred that the pages be linked to the database 16, so that changes to the CSR data made on the page are automatically made in the database 16, according to the methods previously discussed (i.e. The data is sent via the CSR computer 18 to the Web server 14 to the database 16).

Figure 21:
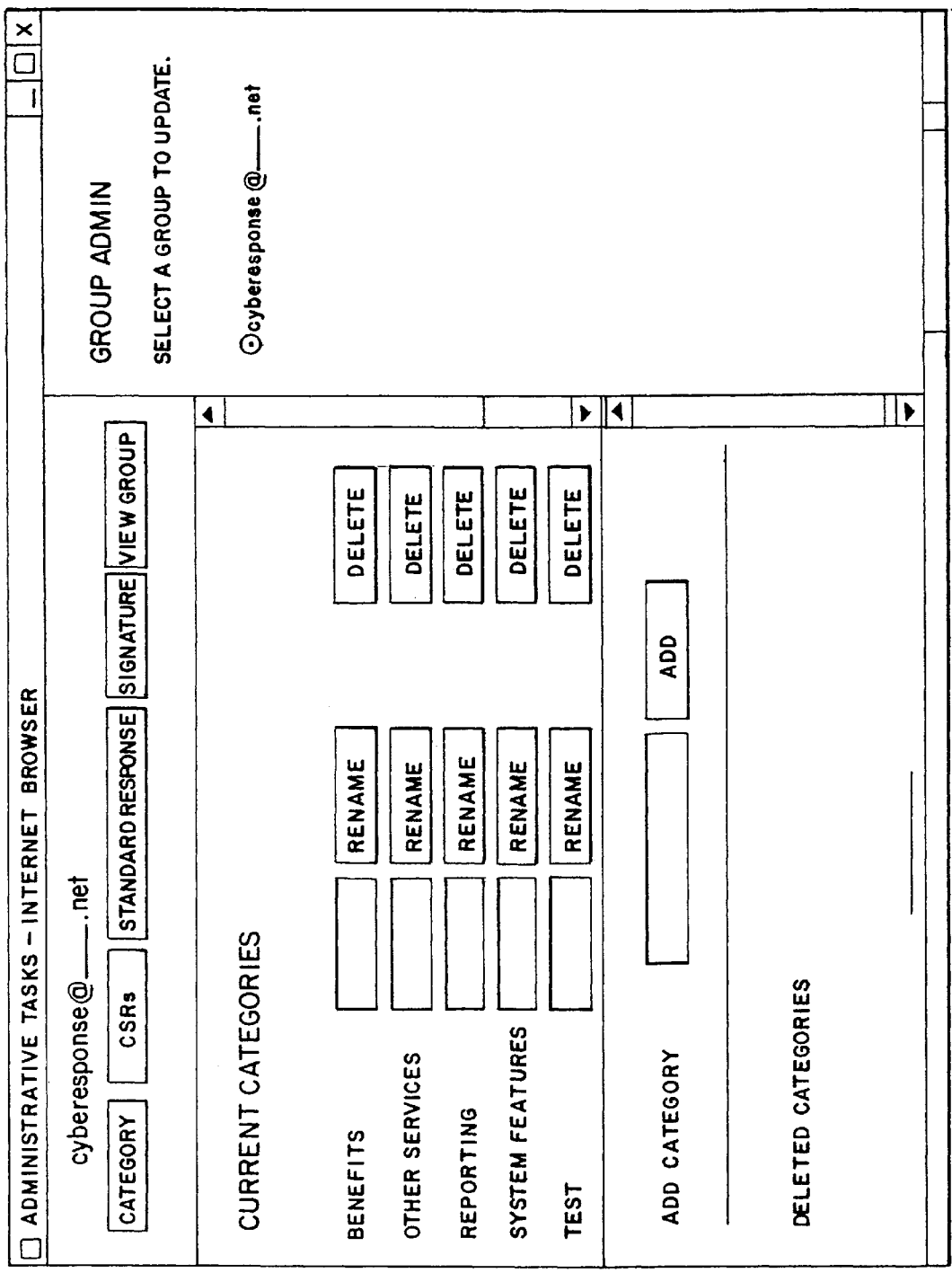
Figure 23:
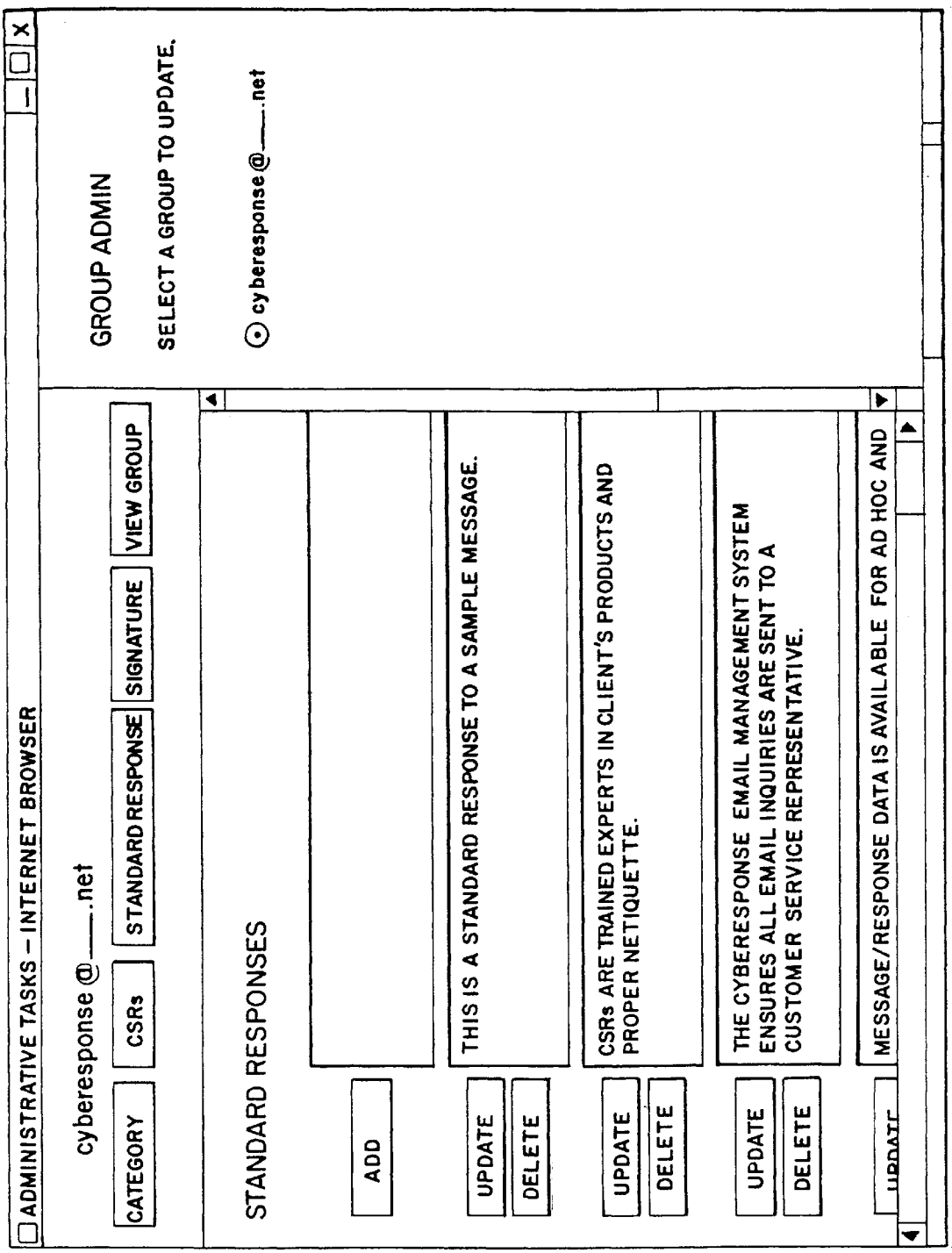
Figure 24:
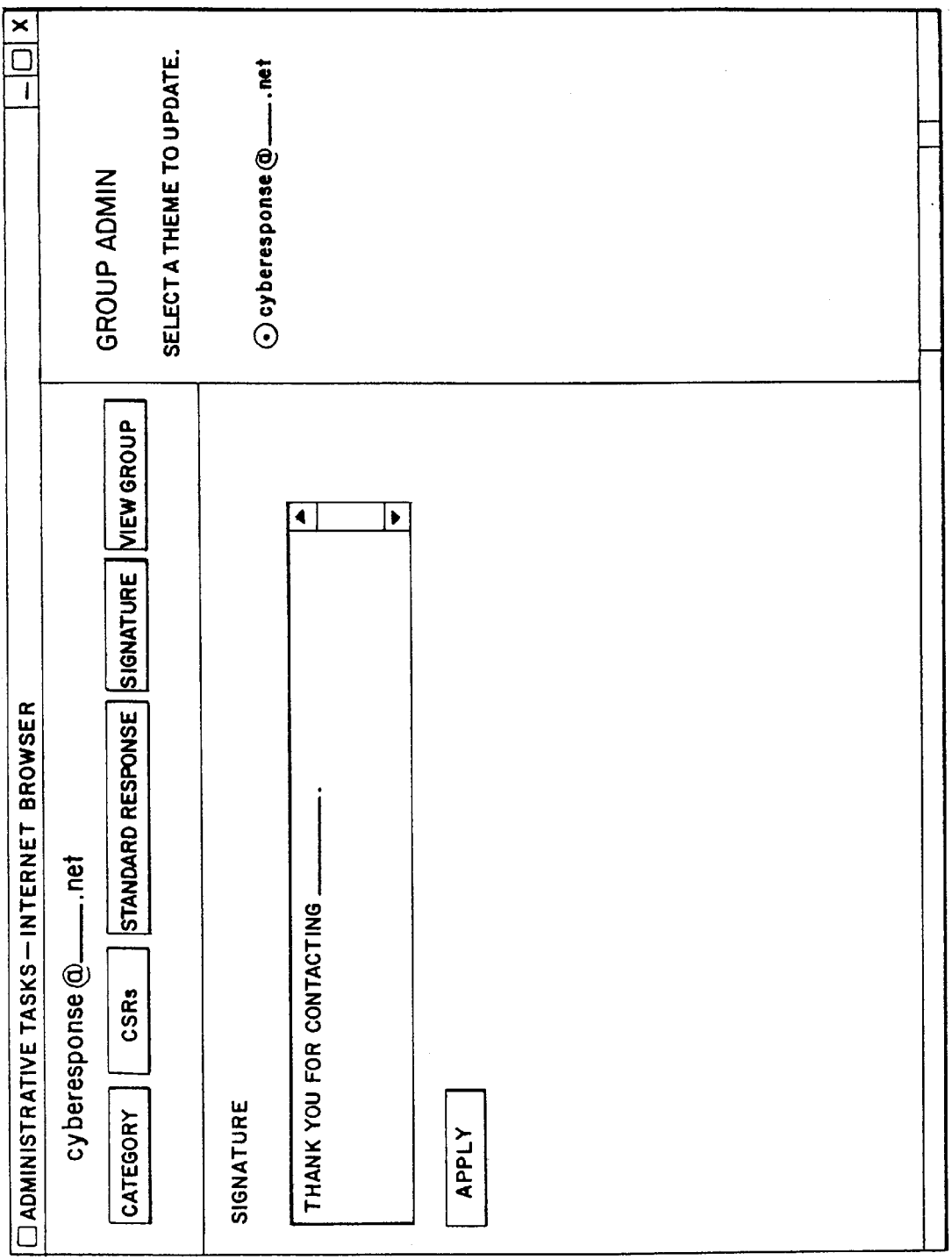
Figure 27:
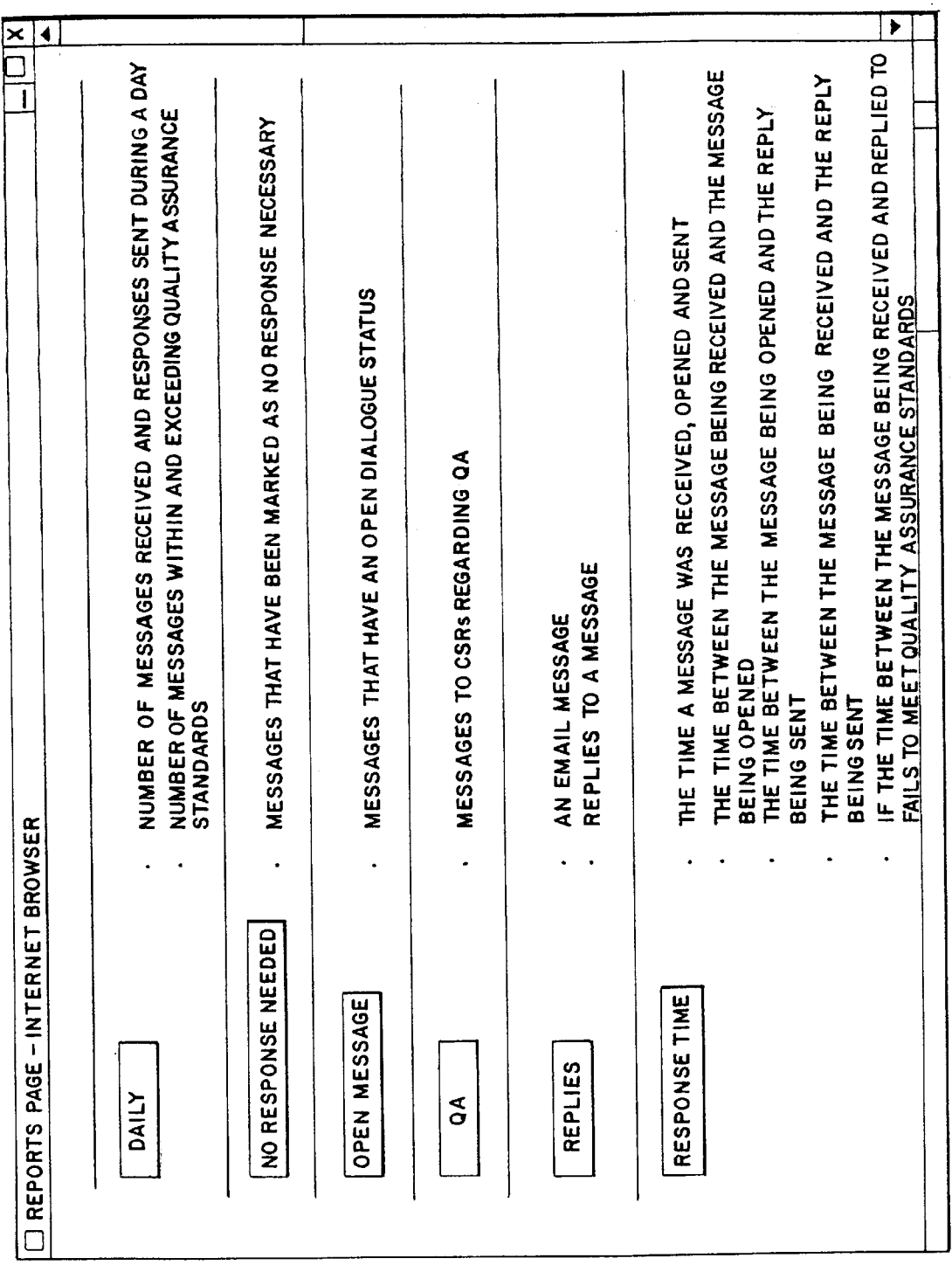
Figure 28:
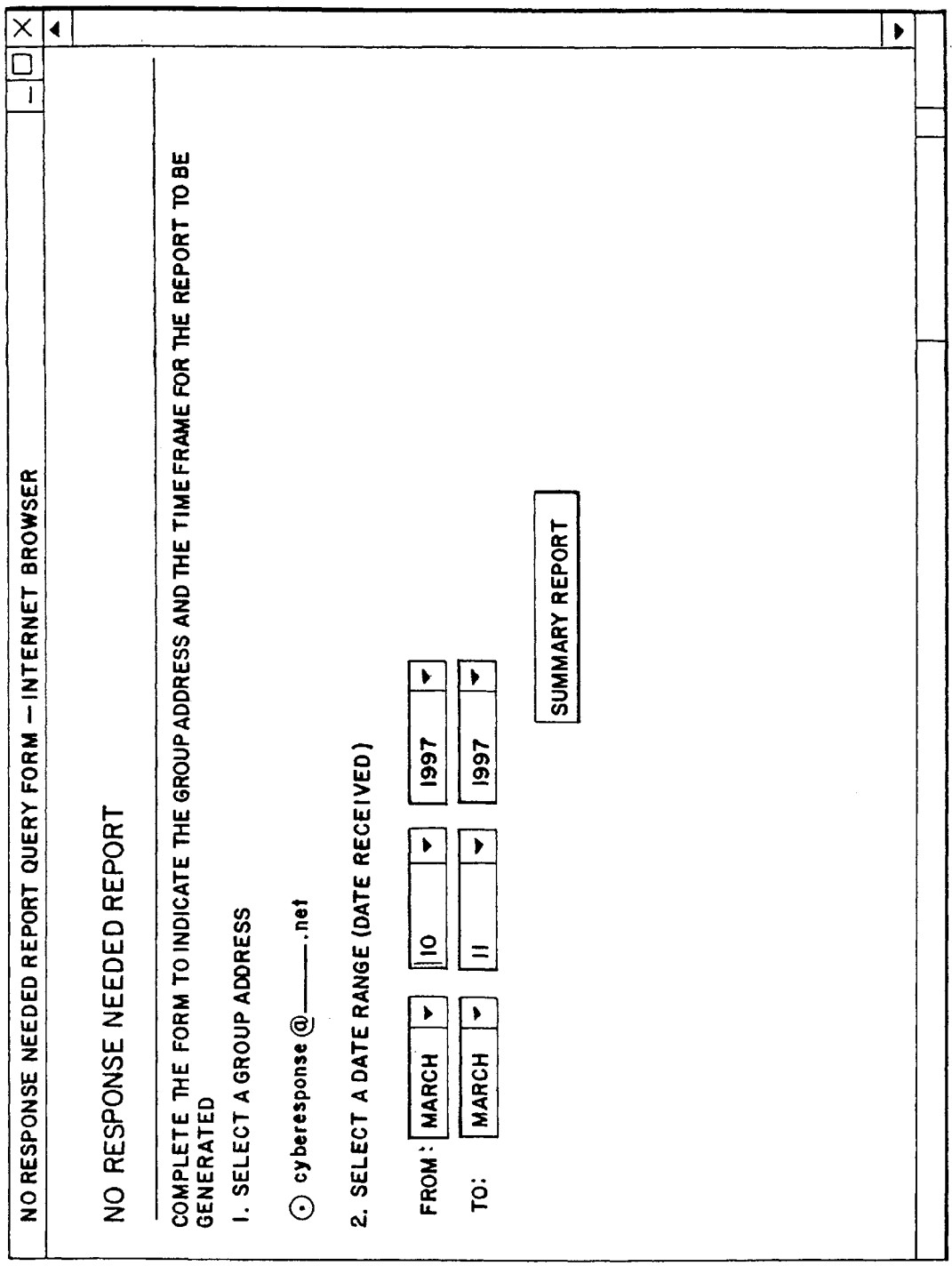
Figure 29:
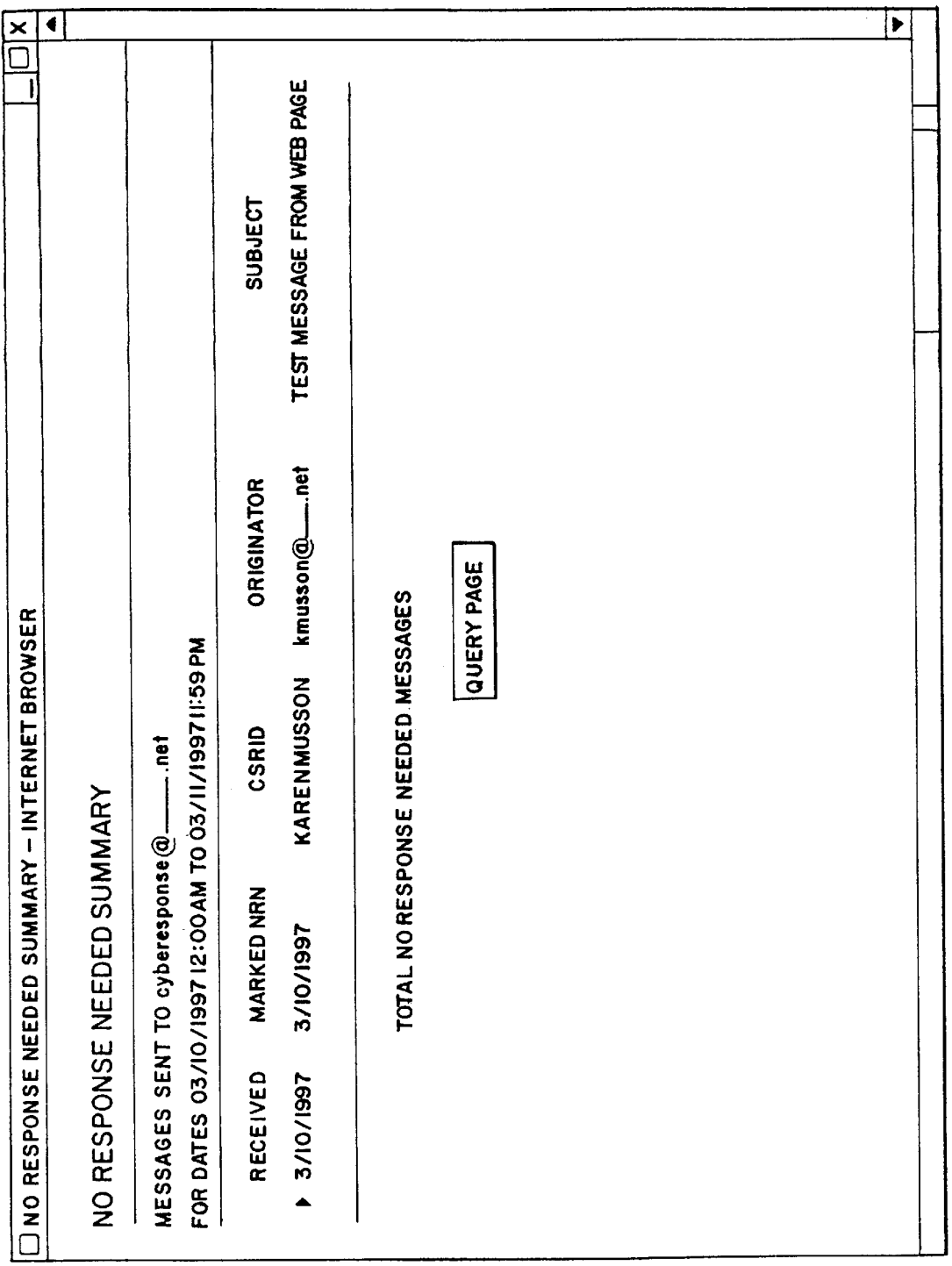

The administrative CSR may also choose to update a group, or a group address. FIG. 21 illustrates example screen shots displayed at the administrative CSR's computer 18 for updating group data. As illustrated in FIG. 21, an administrative CSR may have the option block 140 to:

change the categories of a group block 142, FIG. 21;

assign CSRs to a group block 144, FIG. 22;

add or change standard responses of the group block 146, FIG. 23;

add or change the signatures of the group FIG. 24; or view a summary page of the group FIG. 25.

It is preferred that these pages be linked to the database 16, so that changes to the group data made on the page are automatically uploaded to the database 16.

Figure 9:
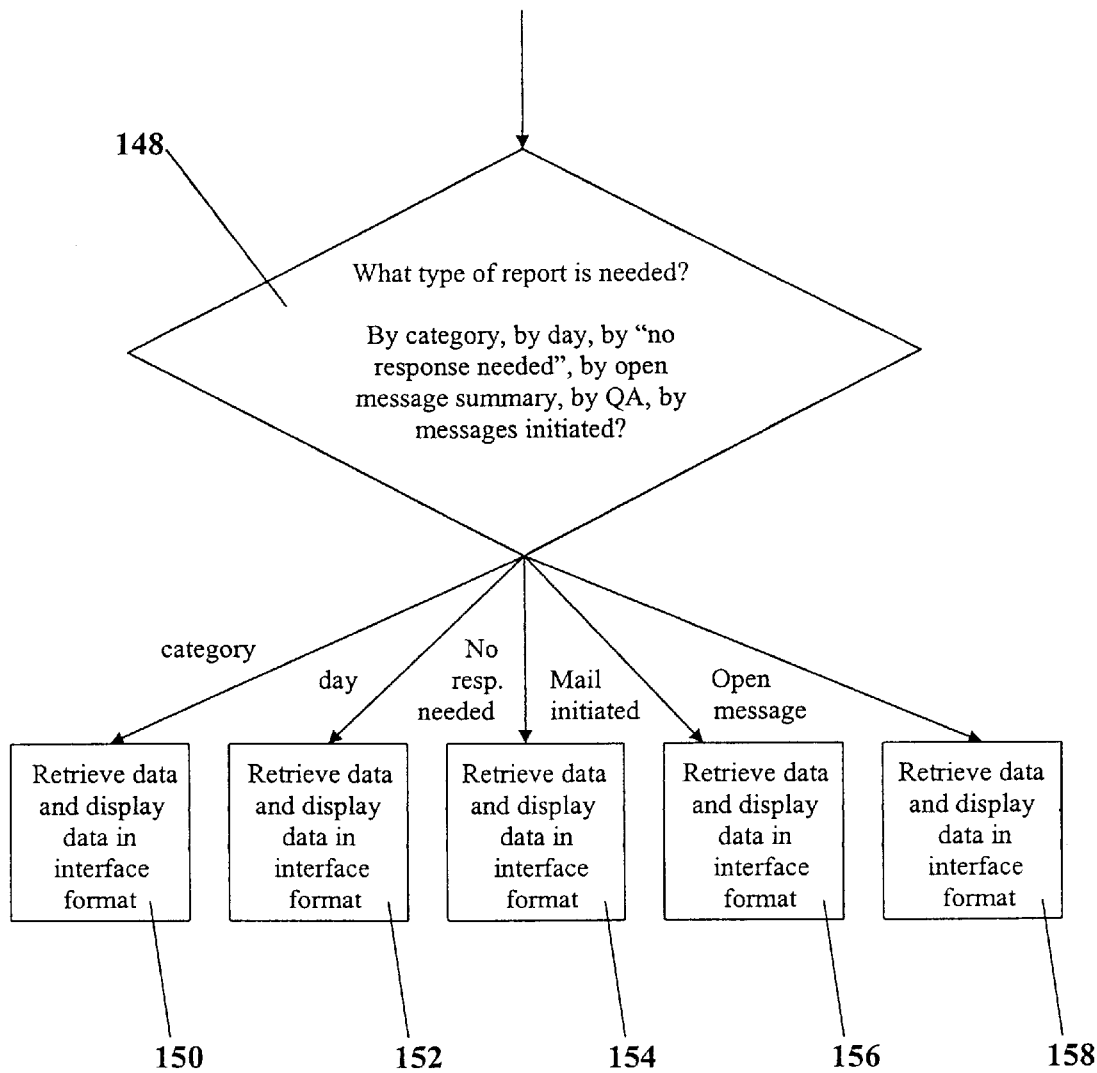
FIG. 9 illustrates a flow chart depicting the steps for requesting a report.
Figure 10:
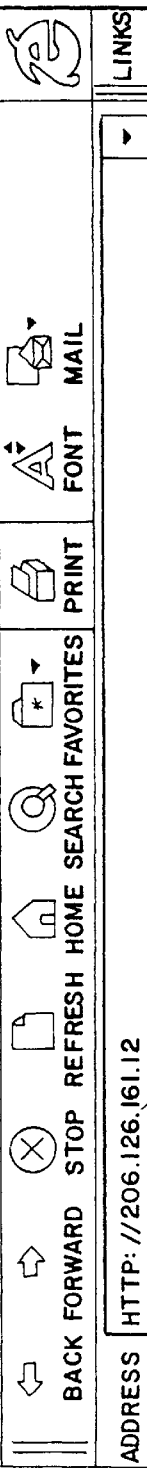
Figure 11:
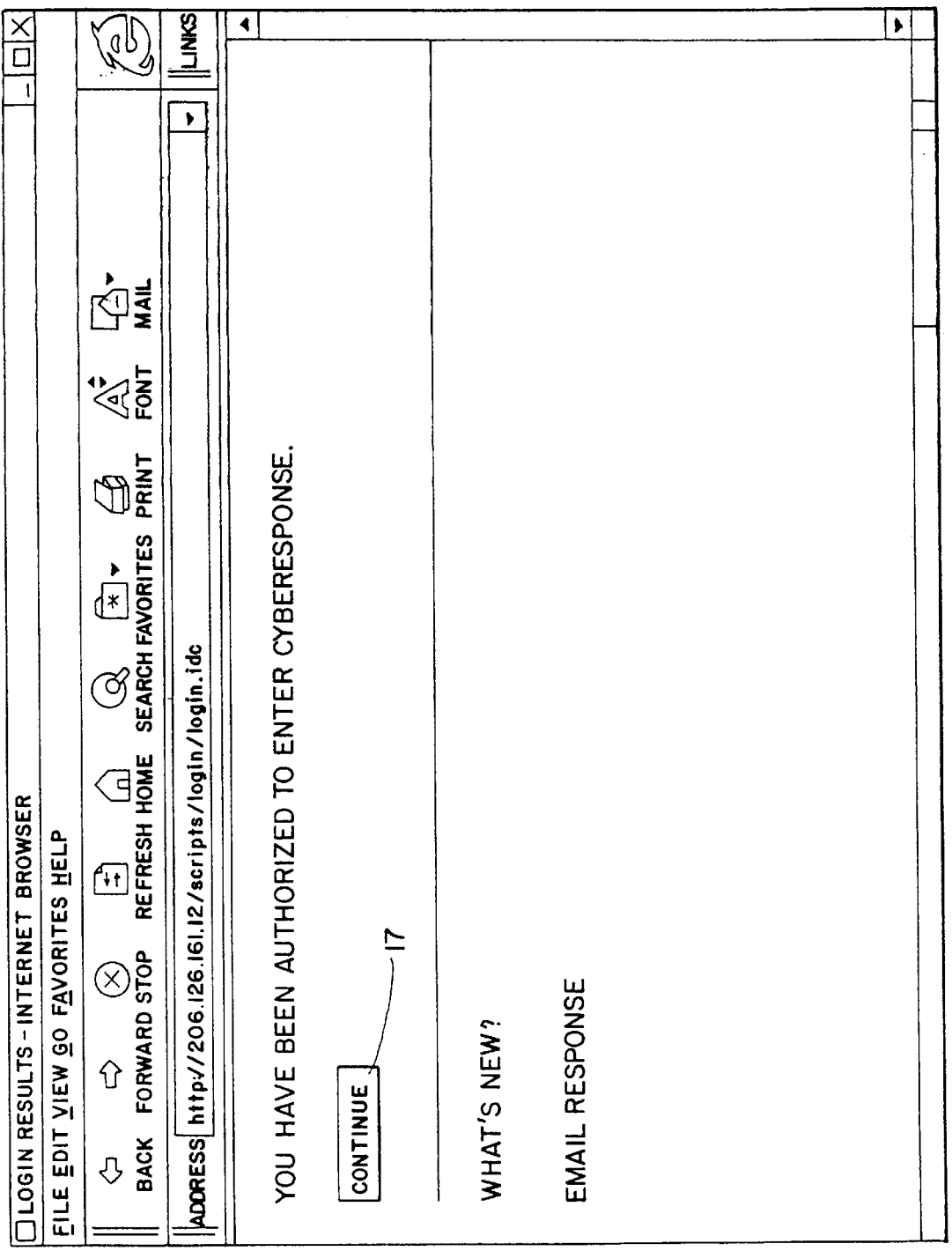

The administrative CSR may also grant other CSRs the privilege to view reports (Reports CSRs). The Reports CSRs may choose to view a report on a certain group. FIG. 9 illustrates a flow chart depicting the steps for requesting a report. In the preferred embodiment, the Reports CSRs have the option to view a report of a group block 148 based on either the:

category of messages block 150;

time and/or day the messages were received block 152;

messages of a group that did not need a response block 154;

messages that were initiated by a CSR block 156;

messages that are still pending block 158; or messages that have been reviewed by a QA CSR.

FIGS. 26–34 illustrate example screen shots displayed at the administrative CSR's computer 18 for viewing and printing group reports. The reports are created by retrieving the appropriate data from the database 16 and sending them to the CSR computer 18 to be displayed in a predetermined interface format, preferably created by HTML. As discussed, the requests for data sent from these pages are sent to the server 14 which interfaces these data requests to the database 16.

It is also preferred that the present system allow the CSRs to initiate e-mail messages to the customers from their computers 18. It is also preferred that the CSRs e-mail programs be linked to the database 16 so that the system may track and store:

i) which CSR sent the e-mail;

ii) when the e-mail was sent;

iii) where the e-mail was sent; and iv) what the e-mail message consisted of.

This feature allows the system of the present invention to track CSR performance for CSR initiated e-mails similarly to the tracking of CSR responses to customer initiated messages.

Having shown and described a preferred embodiment of the invention, those skilled in the art will realize that many variations and modifications may be made to affect the described invention and still be within the scope of the claimed invention. It should be appreciated that the present system may be implemented by other data protocols, programming languages, and differing arrangements of certain programs and interfaces not discussed in the present application. Thus, many of the elements indicated above may be altered or replaced by different elements which will provide the same result and fall within the spirit of the claimed invention. It is the intention, therefore, to limit the invention only as indicated by the scope of the claims.

What is claimed is:

1. A system for managing e-mail messages from customers, comprising:

a first programmed digital computer capable of receiving said e-mail messages;

a relational database interfaced to said first programmed digital computer, wherein said e-mail messages from said customers are automatically forwarded to said relational database from said first programmed digital computer; and wherein said stored e-mail messages are structured in said relational database by predetermined attributes of said e-mail message, and where said stored e-mail messages may be electronically accessed by at least one of said predetermined attributes by a customer service representative entitled to review said e-mail messages.

2. A system according to claim 1, wherein said relational database is a sql database.

3. A system according to claim 1, further comprising:

a second programmed digital computer electronically interfaced to said relational database, wherein said customer service representative at said second programmed digital computer may retrieve and view said stored e-mail messages from said relational database.

4. A system according to claim 3, wherein said first programmed computer is configured with mail server software.

5. A system according to claim 4, wherein said data interface further includes an open database connectivity interface for providing a standard interface to said relational database.

6. A system according to claim 3, wherein said second programmed computer is configured with Web browser software.

7. A system according to claim 3, further comprising:

a data interface for receiving data requests originating from said second programmed digital computer and converting said data requests to a language that said relational database will recognize.

8. A system according to claim 3, wherein said incoming communications line is connected to receive messages from the Internet.

9. A system according to claim 8, further comprising:

a third programmed digital computer, remotely located from said system and interfaced to said first programmed digital computer through said Internet; and wherein said third programmed digital computer is configured to allow interface to said first programmed digital computer.

10. A system according to claim 3, wherein one of said predetermined attributes of said e-mail message is the time that said e-mail message was received by said first programmed digital computer.

11. A system according to claim 3, wherein one of said predetermined attributes of said e-mail message is the e-mail address of said customer who sent said e-mail message.

12. A system according to claim 3, wherein one of said predetermined attributes of said e-mail message is a number assigned to each of said e-mail messages.

13. A system according to claim 6, wherein said relational database contains structured data relating to a list of customer service representatives, said data relating to a list of customer service representatives being structured by predetermined attributes.

14. A system according to claim 3, wherein said one of said attributes of said customer service data includes access privileges to said e-mail messages stored on said relational database.

15. A system according to claim 3, wherein said second programmed computer is configured to allow said customer service representative to respond to said e-mail messages received from said relational database; and wherein said customer service representative responses are tracked on said relational database.

16. A system according to claim 15, wherein one of said predetermined attributes of said e-mail message is the status of said e-mail message.

17. A system according to claim 16, wherein said status of one of said e-mail messages which has not been responded to will be a pending status.

18. A method for managing electronic messages from customers, said electronic messages received from the Internet or an intranet, comprising the steps of:

receiving electronic messages from said customers;

automatically forwarding said electronic messages to a structured database;

storing said electronic messages in said database;

structuring said storage of each one of said electronic messages by predetermined message attributes; and providing an interface for allowing customer service representatives access to said database from a computer located apart from said database.

19. A method according to claim 18, further comprising the step of: accepting a database access request from said customer service representative.

20. A method according to claim 18, further comprising the step of: accepting a data request from said customer service representative.

21. A method according to claim 20, further comprising the step of:

translating said data request into a language of said database.

22. A method according to claim 20, further comprising the step of:

transmitting requested data from said database to said interface.

23. A method according to claim 22, further comprising the step of:

translating said transmitted data into a language of said interface.

24. A method according to claim 22, further comprising the step of:

transmitting said requested data from said interface to said computer of said customer service representative; and displaying, to said customer service representative, said requested data.

25. A method according to claim 18, further comprising the step of:

providing an attribute, in said database, for each of said electronic messages by the time each of electronic messages were received from said customer.

26. A method according to claim 18, further comprising the step of:

providing an attribute, for each of said electronic messages in said database, based on the email address of the customer.

27. A method according to claim 18, further comprising the step of:

providing an attribute, for each of said electronic messages in said database, based on the current status of said electronic message.

28. A method according to claim 27, further comprising the step of:

updating said status attribute of an electronic message that has been responded to.

29. A method according to claim 18, further comprising the step of:

retrieving at least one of said electronic messages based on one of said predetermined attributes.

30. A method according to claim 18, further comprising the step of:

storing data relating to said customer service representatives in said database.

31. A method according to claim 30, further comprising the step of:

structuring storage of said customer service representative (CSR) data in said database by predetermined CSR attributes.

32. A method according to claim 31, further comprising the steps of:

receiving a request at said interface, by one of said customer service representatives, for a list of certain ones of said electronic messages in said database;

checking at least one of said CSR attributes in said database to determine whether said customer service representative is allowed access to said list of electronic messages; and sending said list of certain ones of said electronic messages to said customer service representative if said customer service representative is allowed access to said electronic messages.

33. A method according to claim 32, further comprising the steps of:

receiving a request, from said customer service representative, to access one of said electronic messages;

transmitting said one of said electronic messages to said customer service representative; and responding to said one of said electronic messages.

34. A method according to claim 31, further comprising the step of:

changing said CSR attributes based on changed CSR privileges.

35. A method according to claim 31, further comprising the step of:

prov255ing an attribute, for each said customer service representative in said database, based on quality assurance privileges.

36. A method according to claim 18, further comprising the steps of:

receiving a request at said interface, from one of said customer service representatives, to access one of said electronic messages; and transmitting said one of said electronic messages to said customer service representative.

37. A method according to claim 36, further comprising the steps of:

responding to said one of said electronic messages; and storing said response in said database.

38. A method according to claim 37, further comprising the step of:

transmitting said response to one of said customers.

39. A method according to claim 38, further comprising the step of:

updating one of said predetermined message attributes of said responded to electronic message to indicate that a response was sent.

40. A method according to claim 36, further comprising the step of:

updating one of said predetermined message attributes of said responded to electronic message to indicate that a quality assurance review must be conducted on said response.

41. A method according to claim 40, further comprising the steps of:

receiving a request from a quality assurance representative to review response; and sending said response to said quality assurance representative for review.

42. A method according to claim 41, further comprising the steps of:

conducting a quality assurance review on said response; and approving said response if said response meets quality assurance requirements.

43. A method according to claim 42, further comprising the steps of:

transmitting said response to one of said customers; and updating one of said predetermined message attributes of said electronic message to indicate that a response has been sent.

44. A method according to claim 43, further comprising the steps of:

receiving a request at said interface for a report, said report providing information on the status of all electronic messages of one group;

accessing said report information from said database; and transmitting said report information to a party requesting said report.

45. A method according to claim 44, wherein the step of receiving a request at said interface for a report is followed by the step of translating said report request into a language of said database.

46. A method according to claim 44, wherein the step for accessing said report information from said database is followed by the step for translating said report information into a format recognized by said computer of said customer service representative.

47. A method according to claim 36, further comprising the steps of:

forwarding said one of said electronic messages to an expert; and and updating said database to indicate said one of said electronic messages has been sent to said expert.

48. A method according to claim 47, further comprising the steps of:

having an expert respond to said one of said electronic messages; and updating said database to indicate that said expert responded to said one of said electronic messages.

49. A system for managing electronic messages received from the Internet or an intranet, comprising:

a first programmed digital computer, said first programmed digital computer programmed to accept e-mail messages, said first programmed digital computer programmed with mail server software;

a database for storing said electronic messages according to predetermined message attributes;

a second programmed digital computer in electrical communication with said first programmed digital computer, wherein said second programmed digital computer is configured with Web server software;

a third programmed digital computer in electrical communication with said first programmed digital computer configured with web browser software;

wherein said received electronic messages are forwarded by said first programmed digital computer to said database; and wherein a customer service representative (CSR) may retrieve any of said stored electronic message based on any of said predetermined message attributes, said customer service representative located at said third programmed digital computer.

50. A system according to claim 49, wherein said third programmed digital computer is configured to allow said customer service representative to respond to an electronic message that has been retrieved from said database; and wherein a data interface converts data requests from said second programmed computer to said database so that said database may receive instructions from said first programmed digital computer and so that said first programmed computer may receive data from said database.

51. A system according to claim 49, wherein one of said predetermined message attributes is the time the electronic message was received.

52. A system according to claim 49, wherein one of said predetermined message attributes is the e-mail address of the customer who sent said electronic message.

53. A system according to claim 49, wherein one of said predetermined message attributes is the current status of said electronic message.

54. A system according to claim 49, wherein one of said predetermined message attributes is the e-mail address of the group to which the electronic message was sent.

55. A system according to claim 49, wherein said database stores said electronic messages and data of CSR privileges.

56. A system according to claim 55, wherein said data of CSR privileges includes access privileges to said database.

57. A system according to claim 55, wherein said data of CSR privileges includes quality assurance privileges.

58. A system according to claim 55, wherein said data of CSR privileges includes CSR passwords.

59. An electronic message management method, comprising the steps of:

receiving electronic messages at an electronic network;

forwarding said electronic messages to a database;

storing said electronic messages based on predetermined message attributes;

interfacing a customer service representative computer to allow electronic access to said electronic messages; and transmitting one of said stored electronic messages from said database to said customer service representative.

60. The method according to claim 59, wherein one of said predetermined message attributes is an e-mail address of the group to which the e-mail message was sent.

61. The method according to claim 59, wherein one of said predetermined message attributes is the status of said electronic message.

62. The method according to claim 59, further comprising the steps of:

responding to said transmitted message; and automatically updating said database upon responding to said transmitted message to indicate a response has been sent.

63. The method according to claim 59, further comprising the steps of:

forwarding said transmitted message to an expert;

updating said database, after the step of forwarding said transmitted message to said expert, to indicate that said transmitted message has been forwarded to said expert; and formulating a response from said expert.

64. The method according to claim 59, further comprising the steps of:

providing a response to said transmitted electronic message;

storing said response in said database; and retrieving said stored response for quality assurance review.

65. The method according to claim 64, further comprising the steps of:

denying said response; and updating said database to indicate that said response was denied.

66. The method according to claim 64, further comprising the steps of:

accepting the response; and sending said response to an originating customer.

67. The method according to claim 59, further comprising the steps of:

storing CSR data in said database; and providing access to said database base on said CSR data.

68. The method according to claim 59, further comprising the step of:

storing a list of standard responses in said database.

69. The method according to claim 52, further comprising the steps of:

retrieving certain ones of said standard responses from said database; and sending at least one of said standard responses to an originating customer of said transmitted electronic message.

70. A method for managing electronic messages from customers, said electronic messages received from the Internet or an intranet, comprising the steps of:

receiving electronic messages from said customers;

transferring said electronic messages to a structured database;

storing said electronic messages in said database;

structuring said storage of each one of said electronic messages by at least one predetermined message attribute; and providing an interface for allowing customer service representatives access to said database from a computer.

71. A method according to claim 70, further comprising the step of:

retrieving one of said electronic messages by at least one predetermined message attribute.

72. A method according to claim 71, further comprising the steps of:

responding to said one of said electronic messages; and updating said database to indicate that said one of said electronic messages has been responded to.

* * * * *

UNITED STATES PATENT AND TRADEMARK OFFICE
CERTIFICATE OF CORRECTION

PATENT NO. : 6,122,632
DATED : September 19, 2000
INVENTOR(S) : Jennifer M. Botts et al.

It is certified that error appears in the above-identified patent and that said Letters Patent is hereby corrected as shown below:

column 13, line 14, please delete the number "6" and replace it with -- 3 --.

column 13, line 19, please delete the number "3" and replace it with -- 13 --.

Signed and Sealed this

First Day of May, 2001

Attest:

NICHOLAS P. GODICI

Attesting Officer     Acting Director of the United States Patent and Trademark Office